US008055064B2

(12) United States Patent
Kiuchi et al.

(10) Patent No.: US 8,055,064 B2
(45) Date of Patent: Nov. 8, 2011

(54) PRINTED PRODUCT, PRINTED PRODUCT DETECTION METHOD AND DETECTION APPARATUS, AND AUTHENTICATION METHOD AND AUTHENTICATION APPARATUS

(75) Inventors: Masato Kiuchi, Kashiwa (JP); Yoshinobu Matsumoto, Tokyo-To (JP)

(73) Assignee: National Printing Bureau, Incorporated Administrative Agency, Tokyo (JP)

( * ) Notice: Subject to any disclaimer, the term of this patent is extended or adjusted under 35 U.S.C. 154(b) by 1077 days.

(21) Appl. No.: 11/886,236

(22) PCT Filed: Mar. 28, 2006

(86) PCT No.: PCT/JP2006/306303

§ 371 (c)(1),
(2), (4) Date: Sep. 13, 2007

(87) PCT Pub. No.: WO2006/106677

PCT Pub. Date: Oct. 12, 2006

(65) Prior Publication Data

US 2009/0128858 A1 May 21, 2009

(30) Foreign Application Priority Data

Mar. 30, 2005 (JP) ................................ 2005-096758

(51) Int. Cl.
*G06K 9/00* (2006.01)

(52) U.S. Cl. ........................ 382/162; 382/100; 382/164

(58) Field of Classification Search .................. 382/100, 382/164, 162; 358/3.01, 1.9, 3.26, 3.28, 358/1.12; 347/116, 19; 345/443; 33/438
See application file for complete search history.

(56) References Cited

U.S. PATENT DOCUMENTS

| | | | | |
|---|---|---|---|---|
| 3,908,275 | A * | 9/1975 | Shimizu | 33/438 |
| 6,930,686 | B1 * | 8/2005 | Aranda et al. | 345/443 |

FOREIGN PATENT DOCUMENTS

| | | | |
|---|---|---|---|
| JP | 07-220018 | A | 8/1995 |
| JP | 8-197828 | A | 8/1996 |
| JP | 8-300800 | A | 11/1996 |
| JP | 11-161757 | A | 6/1999 |
| JP | 2000-118121 | A | 4/2000 |
| JP | 2001-88361 | A | 4/2001 |
| JP | 2003-200647 | A | 7/2003 |
| JP | 2003-246134 | A | 9/2003 |

* cited by examiner

*Primary Examiner* — Anh Hong Do
(74) *Attorney, Agent, or Firm* — Birch, Stewart, Kolasch and Birch, LLP

(57) ABSTRACT

This invention implements a printed product capable of embedding a variety of information which are unrecognizable by human eyes in image lines included in a security line drawing without decreasing the artistic effect of printed image lines and authenticating the information on the basis of the Fourier-transformed pattern of the printed image lines. This invention provides an information authenticable printed product having a plurality of line drawings in which an image line includes a unit image line including a plurality of image lines arrayed in parallel along a normal direction, and the normal-direction intervals between the plurality of image lines in the unit image line are set in correspondence with information to be embedded, an authentication method, a method of embedding information in the printed product, and an authentication apparatus.

8 Claims, 20 Drawing Sheets

15

PRINTED PRODUCT, PRINTED PRODUCT DETECTION METHOD AND DETECTION APPARATUS, AND AUTHENTICATION METHOD AND AUTHENTICATION APPARATUS

TECHNICAL FIELD

The present invention relates to a printed product, a printed product detection method and detection apparatus, and an authentication method and authentication apparatus.

BACKGROUND ART

Anti-forgery/anti-alteration measures are important elements for the printed products of important documents including various kinds of certifications and securities such as stock certificates and bonds. To prevent forgery or alteration of such printed products, a method using, as a design, a figure containing many geometrical patterns and a method of visualizing an unrecognizable latent image by applying some means and effect to a printed product are mainly available.

A representative example of the former method uses a geometrical pattern such as background pattern, a guilloche design pattern, or a relief pattern which are widely used as a design of a securities printed product. In the anti-forgery/anti-alteration measures using a geometrical pattern, a pattern is formed by an aggregate of curved image lines (in the present invention, curved image lines include straight image lines) which fundamentally have a predetermined line width.

These patterns apply artistry to a printed product. The anti-forgery effect is enhanced by, e.g., extracting a pattern by photoengraving or using, in a pattern, colors which are hard to reproduce by a copy machine or complex curved image lines which generate moiré on a scanning line input/output of a copying machine or scanner. However, recently coming advanced photoengraving apparatuses or copying machines render the anti-forgery/anti-alteration measures ineffectual.

The present inventors have proposed the following techniques (1) and (2).

(1) The present inventors have filed an application of an anti-copy pattern forming method and a printed product (Japanese Patent Application No. 6-206140) characterized in that in an aggregate pattern of curved image lines, a portion having no latent image is expressed by a single image line while a portion having a latent image is expressed by at least two image lines. The total line width of the at least two image lines of the portion with a latent image equals the line width of the single image line of the portion having no latent image. The at least two image lines branch from the single image line of the portion without a latent image. The boundary line on the image lines between the portion without a latent image and the portion with a latent image is a straight line which almost perpendicularly crosses a straight line contacting a basic curve of the aggregate pattern of curved image lines at the intersection between the basic curve and the outline of the latent image.

(2) The present inventors have filed an application of a printed product (Japanese Patent Application No. 7-138879) in which in an aggregate pattern of curved image lines, a portion having no latent image is expressed by a solid line while a portion having a latent image is expressed by a periodically broken line. In one period of the periodically broken line of the portion with a latent image, including an actually printed image line portion and a non-image line portion where the image line breaks so no image line exists, the area of the non image line portion is added to that of the image line portion. The image line area ratio of the portion with a latent image and that of the portion without a latent image are the same in the same length in the curve direction.

There are provided an anti-copy pattern forming method and a printed product, which cause a printed product having a pattern according to (1) or (2) to apply an effect of preventing forgery and alteration by a copying machine to an aggregate pattern of curved image lines such as background pattern, a guilloche design pattern, or a relief pattern on important documents including various kinds of certifications and securities such as stock certificates and bonds which require anti-copy.

However, the anti-copy measure using the above-described technique (1) or (2) cannot be a sufficient anti-forgery measure any more because of advanced color copying machines and advanced DTP (DeskTop Publishing) technology.

To solve this problem, a machine read check method capable of a mass authenticity determination process at a high speed has been proposed. However, current machine read check methods of checking a printed product detect functional inks such as magnetic ink, infrared reflection/absorption ink, or fluorescent ink, or materials such as fibers, materials, and chemicals of printing media. These technologies are based on, e.g., specific electromagnetic waves imperceptible to a human and can be applied to only economically appropriate products from the viewpoint of production cost because many technologies depend on the material properties of printed products.

An example of a reading method without particularly considering the production cost of printed products is a method of optically reading a pattern on a printed product capable of using a printing material such as a general print ink. As relatively easy optical reading methods, OCR, OMR, barcode, and two-dimensional code are known. However, to use these optical reading methods for existing products, it is necessary to change the design and specifications.

These optical reading methods are popular in the market but insufficient as an anti-forgery/anti-alteration measure because any symbol is visible as a printed image line and may be decoded and altered.

There are a series of technologies generally called an electronic watermark, which are included in the optical reading methods and apply read information without changing the artistry of, e.g., a design. The electronic watermark is also called a concealed image or digital watermark. As a main application purpose, the electronic watermark embeds copyright information in a document file or a printed product thereof in an advanced copy technology or DTP technology.

The electronic watermark is said to be able to suppress degradation in frequency characteristic even in a replica. Recently, digital images distributed on the Internet often contain an electronic watermark for the purpose of copyright protection. The electronic watermark also takes effect even on a printed product and is often used in posters.

The electronic watermark can maximize its effect in a continuous tone (photo tone) pattern. A continuous tone (photo tone) pattern is multilevel image data and therefore has sufficient redundancy. Many techniques such as a pixel substitution type, pixel space using type, and quantization error diffusion type are proposed in addition to a frequency using type. There are also a lot of references and patent applications related to this technique which is one of the technologies that have received attention presently.

However, an aggregate pattern of curved image lines such as background pattern, a guilloche design pattern, or a relief pattern used in securities is basically a binary image. For this reason, the redundancy is low, and it is difficult to embed an electronic watermark. This poses problems of a low read signal strength and low read accuracy.

Hence, there is a demand for development of an anti-forgery/anti-alteration technology which is independent of the material properties of a printed product and serves as an effective technology of determining authenticity, by a machine reading method, a pattern having anti-forgery properties suitable for important documents including various kinds of certifications and securities such as stock certificates and bonds.

DISCLOSURE OF INVENTION

The present invention has been made in consideration of the above-described situations, and has as its object to provide a printed product having a high anti-forgery effect, a printed product detection method and detection apparatus, and an authentication method and authentication apparatus for a printed product with artistry such as a kind of securities formed from, e.g., a security line drawing.

According to the present invention, there is provided a printed product having a line drawing, characterized in that the line drawing comprises a unit image line including a plurality of image lines arrayed in parallel along a normal direction, and a distance between centers of lines in the normal direction formed by the plurality of lines in the unit image line and/or a width of a margin is set in correspondence with information to be embedded.

At least a background area having no unit image line in the line drawing may have a dummy pattern.

The unit image line may include the plurality of unit image lines having different image line colors, and the plurality of unit image lines may correspond to different pieces of information, respectively.

According to the present invention, there is provided a method of detecting information of the printed product, comprising the steps of:

causing a processor to acquire image data of the line drawing; and detecting the information by causing an image processing unit to execute spatial frequency analysis of the image data, generate a spatial frequency analysis pattern, and output the result.

According to the present invention, there is provided a method of detecting information of the printed product, comprising the steps of:

acquiring color image digital data by causing an optical image input device having a color pass filter to input an image of the printed product to an image input unit or by causing an optical image input device to input an image of the printed product to an image input unit;

acquiring image data corresponding to at least one color unit image line of the plurality of unit image lines by causing an image processing unit to separate the colors of the color image digital data by using filtering by a digital process; and detecting the information by causing an analysis unit to execute spatial frequency analysis of the image data, generate a special frequency analysis pattern, and output the result.

According to the present invention, there is provided a apparatus for detecting information of the printed product, comprising:

a processor which acquires image data of the line drawing;

an image processing unit which extracts a spatial frequency pattern of the unit image line in the line drawing contained in the image data; and an analysis unit which analyzes information contained in the spatial frequency pattern and outputs an analysis result.

According to the present invention, there is provided a method of authenticating information of the printed product, comprising the steps of:

causing a processor to acquire image data of the line drawing;

causing an image processing unit to execute spatial frequency analysis of the image data and generate a spatial frequency analysis pattern; and causing a determination unit to compare the spatial frequency analysis pattern with a predetermined reference pattern and authenticate the information.

According to the present invention, there is provided a method of authenticating information of the printed product, comprising the steps of:

acquiring color image digital data by causing an optical image input device having a color pass filter to input an image of the printed product to an image input unit or by causing an optical image input device to input an image of the printed product to an image input unit;

acquiring image data corresponding to at least one color unit image line of the plurality of unit image lines by causing an image processing unit to separate the colors of the color image digital data by using filtering by a digital process; and causing an analysis unit to execute spatial frequency analysis of the image data and generate a spatial frequency analysis pattern; and causing a determination unit to compare the spatial frequency analysis pattern with a predetermined reference pattern and authenticate the information.

According to the present invention, there is provided a apparatus for authenticating information of the printed product, comprising:

a processor which acquires image data of the printed product;

an image processing unit which cuts out a line drawing portion contained in the image data and extracts a spatial frequency pattern of the unit image line contained in the line drawing;

an analysis unit which analyzes information contained in the spatial frequency pattern; and a determination unit which compares the information of the spatial frequency pattern with information of a spatial frequency pattern contained in a predetermined authentic printed product and determines whether the printed product is authentic.

DESCRIPTION OF THE REFERENCE NUMERALS

Figure 1:
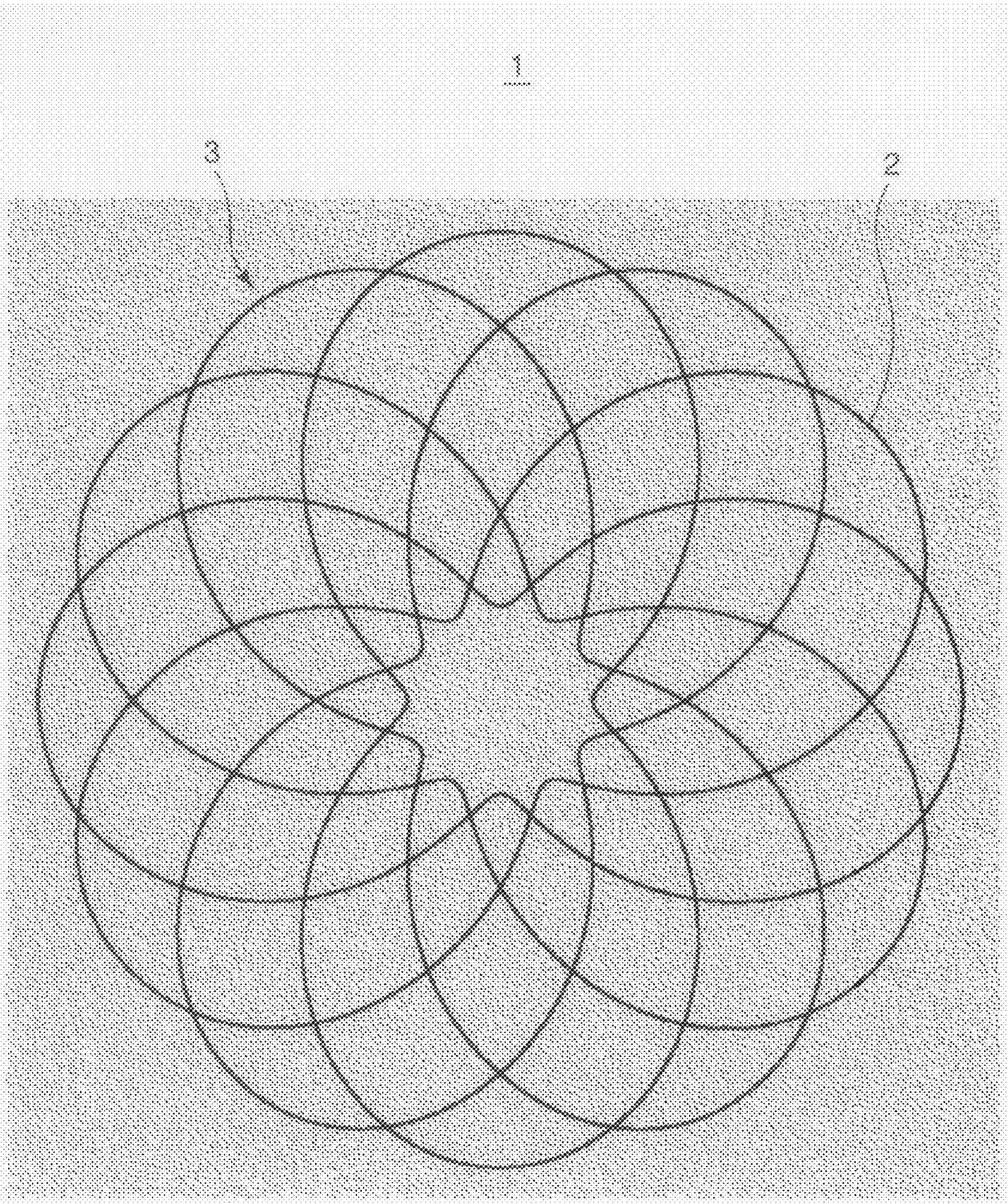
FIG. 1 is a view showing a guilloche design element 3 included in a security line drawing 1 in a printed product according to the first embodiment of the present invention.

1 security line drawing
2 a plurality of image lines included in design
3 guilloche design element
4 printed product of first embodiment
5 unit
6, 13 unit image line
7, 14 unit image line group
8 information curved image line
9 leading curved image line
10 terminal curved image line
11 printed product of first embodiment
12 another unit of first embodiment
15, 16 Fourier-transformed image
C printed product having colored security line drawing
C' separated image of unit image line 6
C" separated image of unit image line 13
17, 18 guilloche design element including line drawing
19, 20 unit image line storage area
21, 22 guilloche design element having unit image line 6
23, 24 guilloche design element having unit image line 13
25 personal certificate printed product
26 portrait portion
27 guilloche design element portion
28 personal information text portion
29 optical image input device
30 processor unit
31 arithmetic unit
31*a* analysis unit
31*b* image processing unit
32 storage unit
33 communication interface (IF)
34 input unit
35 print unit
36 display unit
37 arithmetic unit
37*a* image processing unit
37*b* analysis unit
37*c* determination unit
38 storage unit

BEST MODE FOR CARRYING OUT THE INVENTION

The present inventors have proposed, in Japanese Patent Application No. 2002-1519, an invention related to an information authenticable printed product in which a broken image line portion including a plurality of broken lines arrayed in parallel at a predetermined interval in the longitudinal direction forms the image lines of a security line drawing, a determination method, and an information embedding method. In the technique according to this prior art, the width and length of a broken line are determined such that human eyes can equally recognize the broken image line portion and a normal image line. The broken line is Fourier-transformed. In the Fourier-transformed pattern, a unique frequency is recognized and applied to authenticity determination.

However, in this prior art, the plurality of broken lines included in the broken image line portion that forms the security line drawing are arrayed in parallel in the longitudinal direction simply at a predetermined interval. Hence, applicable information is limited to a unique length, unit length, and the type of frequency generated by unit image lines arrayed by continuous curved lines. It is impossible to obtain a lot of variations.

The present inventors have also proposed, in Japanese Patent Application No. 2002-50606, an invention related to information embedding using a unit image line in which a plurality of units are continuously arrayed. The invention related to this application can give many variations to information. When the unit image line is Fourier-transformed, and a unique frequency contained in the obtained Fourier-transformed pattern is detected, thereby determining authenticity.

In this invention, however, since the units are arrayed in parallel in the longitudinal direction, the repetitive number of units is limited. Additionally, since the image lines are very fine, dropout of unit image lines is unavoidable. For machine reading of image lines, the input resolution is preferably 600 dpi or more, which is high relative to that of general commercial printed products. For this reason, an optical reading apparatus or image processing apparatus capable of machine reading is required to have a sufficient memory capacity and processing speed, resulting in an increase in cost.

The present invention has been made in consideration of these points. A printed product, a printed product detection method and detection apparatus, and an authentication method and authentication apparatus according to an embodiment of the present invention will be described below in detail with reference to the accompanying drawings.

A security line drawing used in securities and bank notes has a geometrical design formed by gathering a plurality of image lines including single-line-like straight lines (straight single lines) and curved lines. Such an image line serving as an element of a security line drawing will be called an "image line" in the present invention. A security line drawing has very high regularity in, e.g., the interval of a plurality of image lines included in a design.

In the following embodiment, placing focus on the regularity, information of a printed product is detected and authenticated by evaluating the correlation of the intervals and positions of a plurality of image lines included in the design of a security line drawing.

In this embodiment, the plurality of image lines ("curved image line intervals" to be described later) included in the security line drawing with regularity are modulated to embed information. A printed product obtained in this way is converted into a digital image. A digital device (more specifically, computer) analyzes the correlation of the intervals and positions in the security line drawing and identifies the information embedded in the printed product, thereby detecting and authenticating the information.

To modulate the security line drawing, in this embodiment, some or all of the image lines included in the security line drawing are formed from unit image lines each including a plurality of units. A unit image line group including a plurality of unit image lines forms a security line drawing.

The plurality of units have a predetermined width (to be referred to as a "unit width" hereinafter) and include a plurality of curved image lines. The plurality of curved image lines in the unit are arranged at appropriate intervals in the normal direction of the image lines, thereby embedding information. That is, the normal-direction intervals between the plurality of curved image lines in the unit are set in correspondence with information to be embedded.

More specifically, in this embodiment, each of image lines included in a security line drawing as an original drawing is formed as a unit image line. A human visually perceives the unit image lines as part of the design of the security line drawing.

To identify embedded information and authenticate the information of a printed product, for example, Fourier transform is executed for the security line drawing formed from a unit image line group including a plurality of unit image lines. Information about the unit width on the security line drawing and the arrangement of curved image lines in each unit is extracted, thereby extracting and identifying the embedded information.

In this embodiment, the image lines included in the security line drawing of a printed product are processed not in each unit but in each unit image line group formed by arranging a plurality of curved image lines. The unit image line group forms a printed product to express a security line drawing and implements a printed product detection method and detection apparatus and an authentication method and authentication apparatus.

First Embodiment

A printed product and a printed product detection method according to the first embodiment of the present invention will be described. FIG. 1 shows an example of a security line drawing as the original drawing of a printed product according to the first embodiment. A security line drawing 1 has a guilloche design element 3 including printed image lines 2. A human can visually recognize the image lines 2 and guilloche design element 3.

Figure 2:
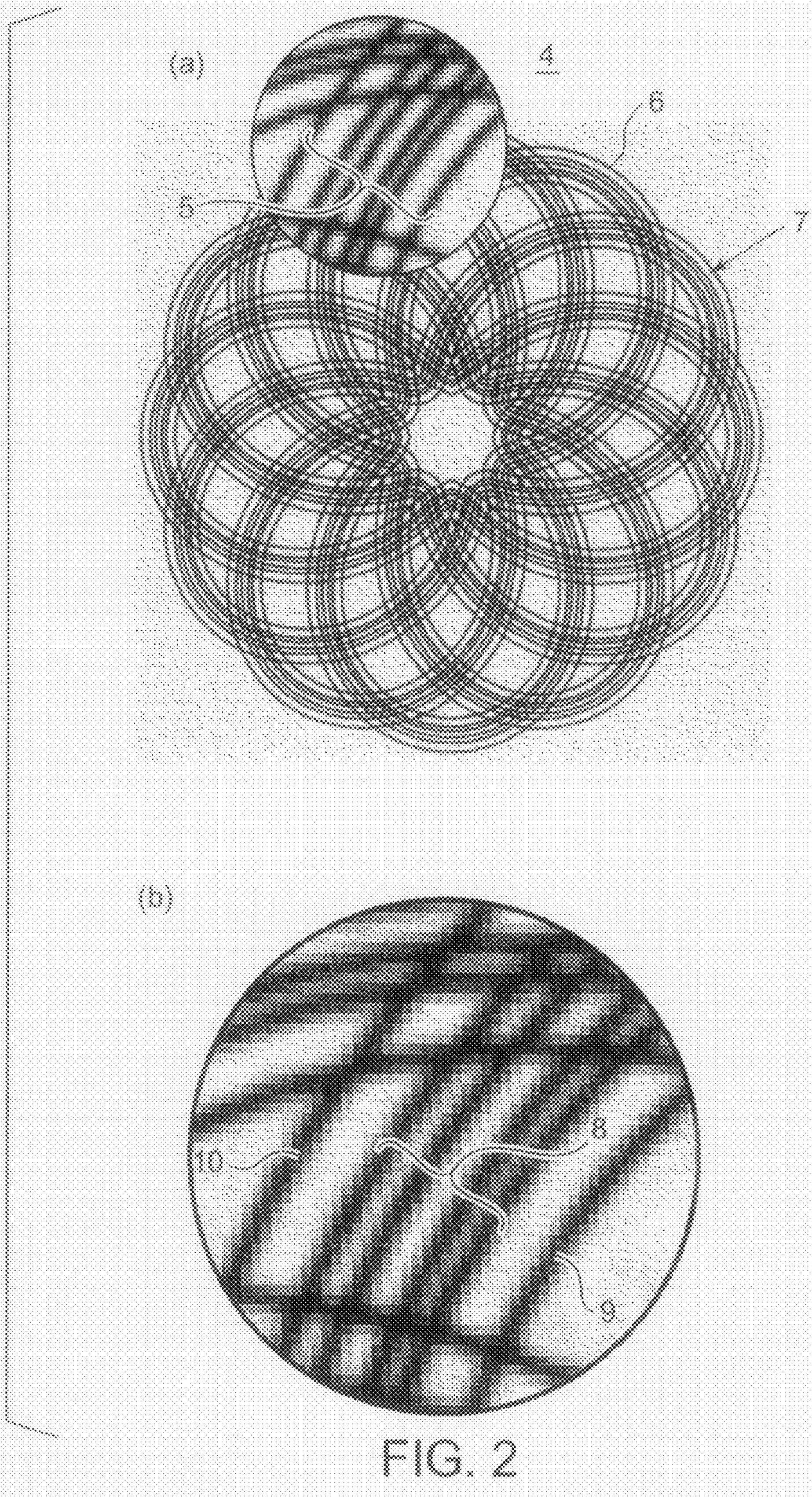
FIG. 2 explains a unit 5 included in a unit image line 6 of a printed product 4 according to the first embodiment.

A printed product 4 according to the first embodiment shown in FIG. 2A is formed on the basis of the guilloche design element 3 of the security line drawing 1. The printed product 4 has an image that is formed by drawing the guilloche design element 3 as a plurality of unit image lines 6 including units 5 with the same structure conforming to the curve shape of the plurality of image lines 2 included in the design of the guilloche design element 3. A unit image line group 7 including the plurality of unit image lines 6 corresponds to the design form of the guilloche design element 3.

FIG. 2A shows a partially enlarged view of the unit image lines 6 in the circle. FIG. 2B is a further enlarged view of one of the unit image lines 6 in the enlarged view. The unit 5 included in the unit image line 6 has a predetermined width (to be referred to as a "unit width" hereinafter) and includes a plurality of curved image lines. More specifically, the unit 5 includes information curved image lines 8 to embed information and a leading curved image line 9 and terminal curved image line 10 arranged on both sides of the information curved image lines 8.

Figure 3:
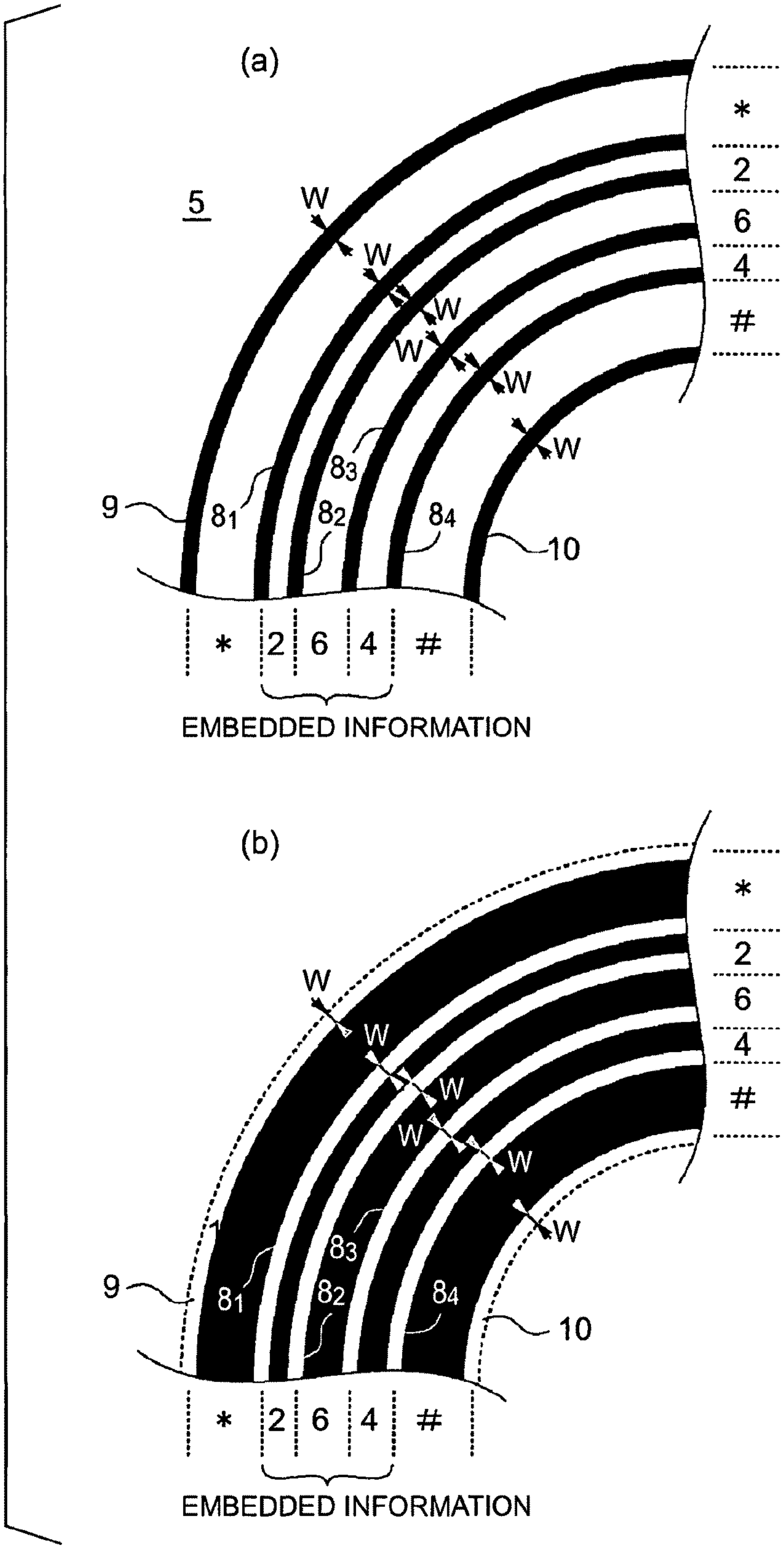
FIG. 3 shows a detailed structure of the unit 5 with predetermined information embedded according to the first embodiment.

The unit 5 has a structure to embed predetermined information. FIG. 3A shows a detailed structure of the unit 5 that embeds predetermined information. The unit 5 is formed by arranging four information curved image lines $\mathbf{8}_1$ to $\mathbf{8}_4$ between the leading curved image line 9 and the terminal curved image line 10. The predetermined information is embedded by appropriately determining the intervals between the four information curved image lines $\mathbf{8}_1$ to $\mathbf{8}_4$. In the first embodiment, an interval indicates the distance from the center of one of the information curved image lines 8, leading curved image line 9, and terminal curved image line 10 to that of an adjacent line.

The intervals are predetermined in correspondence with information elements (e.g., symbols such as numbers) of the information to be embedded. In the first embodiment, the information elements are decimal numbers. Table 1 shows an example of correspondence between the numbers and intervals. In Table 1, * and # indicate identifiers, and their necessity will be described later. The identifier * corresponds to the interval between the leading curved image line 9 and the information curved image line $\mathbf{8}_1$. The identifier # corresponds to the interval between the terminal curved image line 10 and the information curved image line $\mathbf{8}_4$.

TABLE 1

Unit Conversion Table

| Information/ identifier | 0 | 1 | 2 | 3 | 4 | 5 | 6 | 7 | 8 | 9 | * | # |
|---|---|---|---|---|---|---|---|---|---|---|---|---|
| Interval (μm) | 200 | 240 | 280 | 320 | 360 | 400 | 440 | 480 | 520 | 560 | 600 | 640 |

To embed information represented by a combination of decimal numbers "264" in the unit 5, the interval between the identifier * and the information curved image line $\mathbf{8}_1$ is set to 600 μm, the interval between the information curved image line $\mathbf{8}_1$ and the information curved image line $\mathbf{8}_2$ is set to 280 μm, the interval between the information curved image line $\mathbf{8}_2$ and the information curved image line $\mathbf{8}_3$ is set to 440 μm, the interval between the information curved image line $\mathbf{8}_3$ and the information curved image line $\mathbf{8}_4$ is set to 360 μm, and the interval between the information curved image line $\mathbf{8}_4$ and the identifier # is set to 160 μm on the basis of the unit conversion table of table 1. The "interval" can be either the distance between the centers of image lines or the width of a margin except the line widths.

The unit width is represented by the sum of these intervals, 2,320 μm. The unit image line 6 is formed by arranging the unit 5 with the above-described structure in the normal direction of the image line 2 (FIG. 1) of the original line drawing. Note that an image width W of each information curved image line is set to be smaller than the minimum interval between the information curved image lines.

The reason why the identifier * and identifier # need to be arranged in the unit 5 will be described. In the printed product according to the first embodiment, embedded information is detected by, e.g., pattern matching on a Fourier-transformed image. If information "264" is detected in the Fourier-transformed image, graphic patterns like concentric circles appear at frequency positions (radii from the center) corresponding to the information. The frequency positions of the concentric circles representing the information "264" are the same as those of concentric circles detected in an image obtained by Fourier-transforming information "462". The graphic patterns exhibit the same intensity at these positions. It is therefore impossible to distinguish the pieces of information "264" and "462".

To distinguish the two pieces of information, the identifier * corresponding to an interval of 600 μm and the identifier # corresponding to an interval of 160 μm are registered in Table 1 together with the information elements. That is, "*" is used as an identifier indicating the start of information while "#" is used as an identifier indicating the end of information. Assume that only the identifier "*" indicating the start of information is used, and the identifier # indicating the end of information is not used. In this case, "*264" is compared with "*426". The information "*264" can be replaced with "264*" This information is readable from the right side as "*462". That is, "*264" and "*462" exhibit the same Fourier-transformed pattern. When the identifier # indicating the end of information is used, "*264#" and "*462#" do not exhibit the same pattern. It is therefore possible to identify the two pieces of information.

The same effect can be obtained even when the white and black (positive and negative) relationship is reversed, as shown in FIG. 3B.

To form the image lines 2 of the security line drawing 1 shown in FIG. 1 by the unit image lines 6 and display the security line drawing shown in FIG. 2A by the unit image line group 7 as the aggregate of the unit image lines 6, the security line drawing 1 is read by using a digital device such as a scanner to form digital image data such as bitmap data. The image lines 2 are manipulated and replaced with the unit image lines 6 by using drawing software (e.g., "Illustrator" available from Adobe).

Alternatively, a digital image of the security line drawing having the unit image line group 7 as shown in FIG. 2A may be created by a computer using drawing software. Any method is usable if a printed product as shown in FIG. 2A can be obtained by printing a created image. In the first embodiment, the printed product forming method itself is irrelevant to the present invention, and a description thereof will be omitted.

The plurality of unit image lines 6 each including the plurality of units 5 form the unit image line group 7, i.e., security line drawing. The unit image line group 7 has different spatial frequencies based on the intervals between the unit image lines 7. The information "*264#" is embedded in the unit 5. When this image is printed, the information authenticable printed product 4 according to the first embodiment, which appears to be the same as the security line drawing 1 shown in FIG. 1, is formed.

Figure 4:
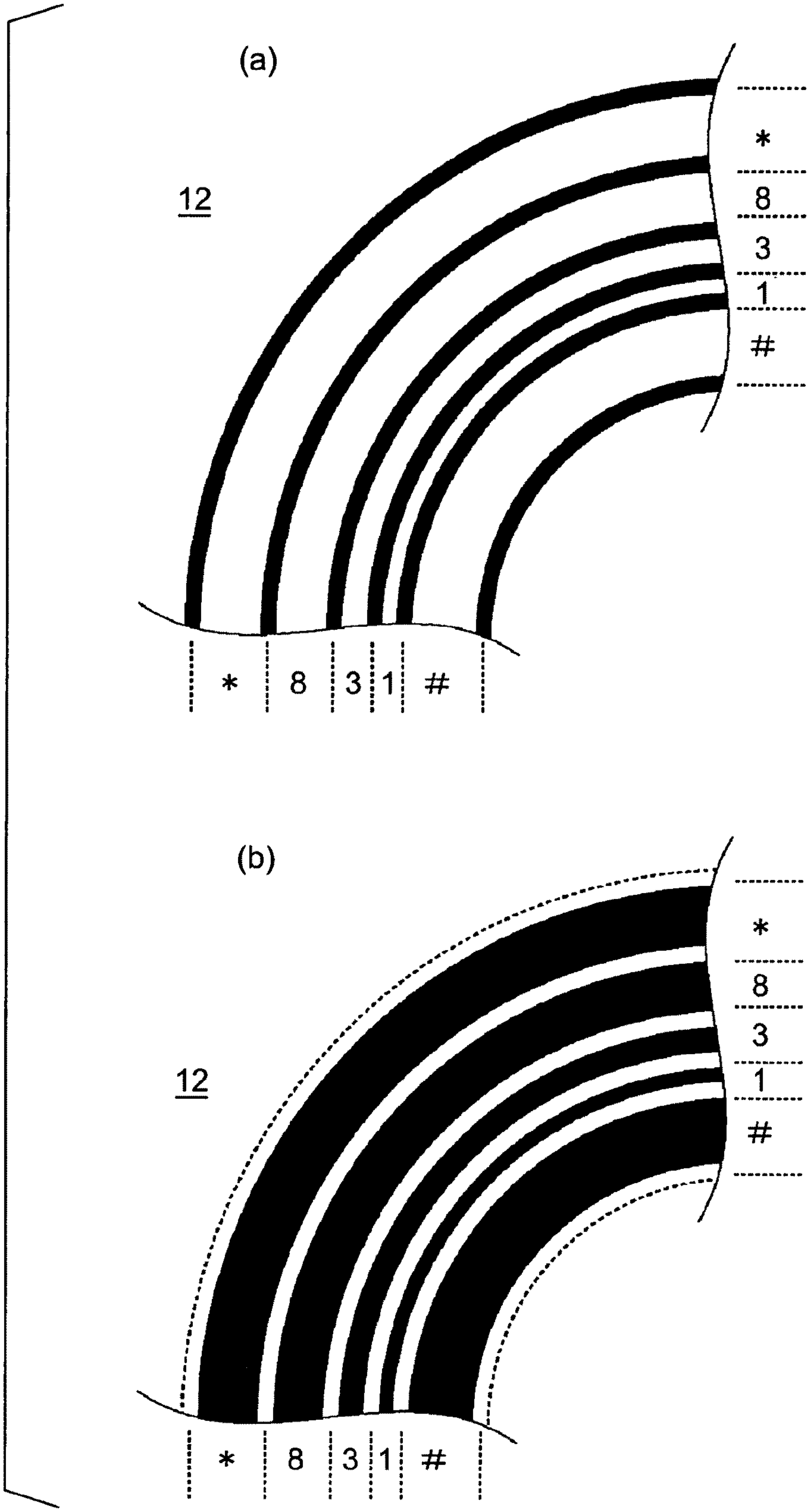
FIG. 4 shows a detailed structure of the unit 5 with predetermined information embedded according to the first embodiment.
Figure 5:
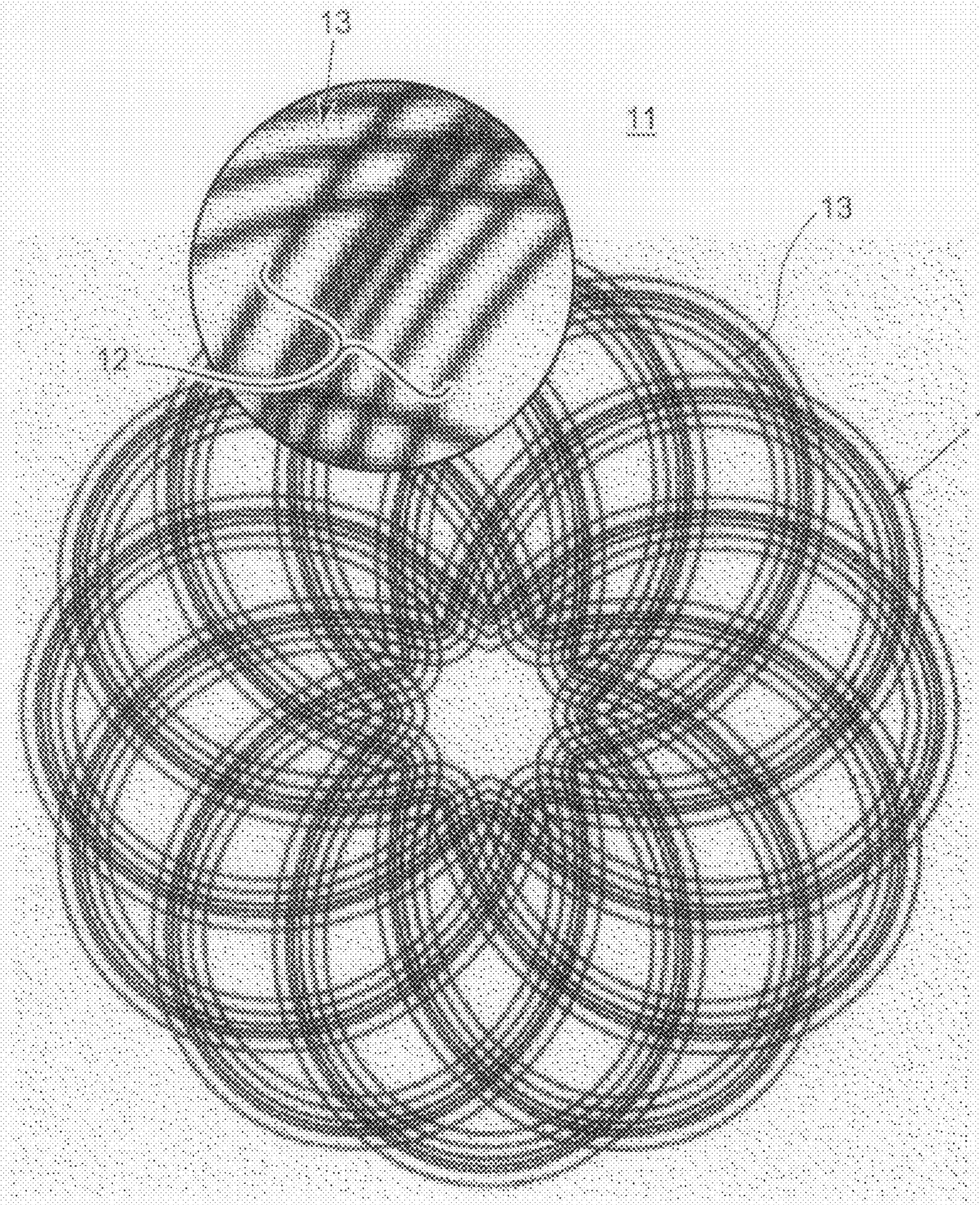
FIG. 5 is a view for explaining a unit 12 included in a unit image line 13 of a printed product 11 according to the first embodiment.

Similarly, for example, to form a printed product 11 having the security line drawing 1 shown in FIG. 1 including a unit 12 with another embedded information "*831#", the intervals between the leading curved image line 9, information curved image lines 8, and terminal curved image line 10 are determined in correspondence with the information "*831#" on the basis of Table 1, as shown in FIG. 4A, thereby forming the unit 12. The unit width of the unit 12 is the same as in the printed product 11, i.e., 2,320 μm.

The same effect can be obtained even when the white and black (positive and negative) relationship is reversed, as shown in FIG. 4B.

A plurality of units 12 are continuously repeated in the image line direction to form a unit image line 13. The image lines 2 in the original drawing 1 are formed by using the unit image line 13. The printed product 11 having the security line drawing is formed by using a unit image line group 14 as the aggregate of the unit image lines 13.

Methods and apparatuses for detecting information of a printed product in which the information is embedded in accordance with the above-described procedure and determining its authenticity will be described. The printed product 4 or 11 is read by an image input device such as a scanner. The reading result is stored as bitmap data (corresponding to an example of "digital image data"). The bitmap data undergoes Fourier transform.

Figure 6:
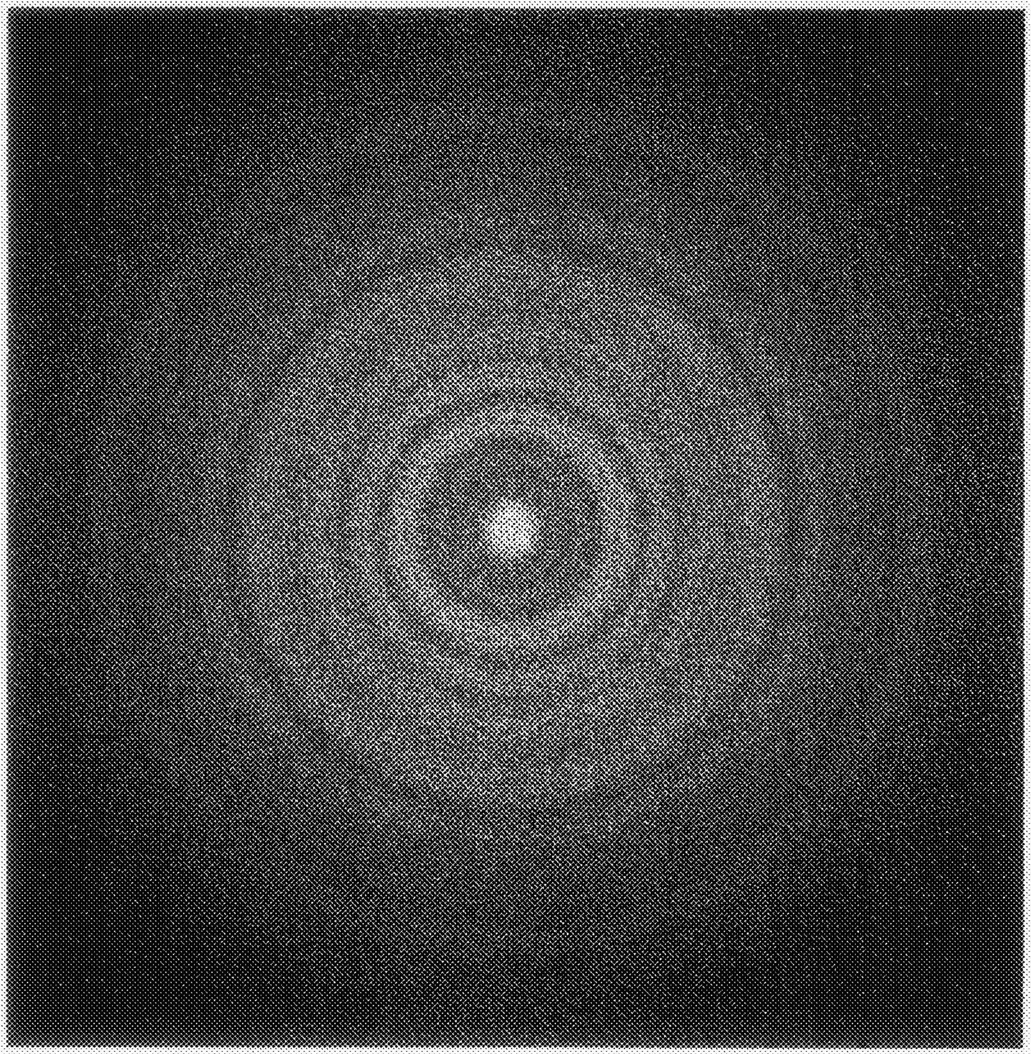
FIG. 6 is a view showing the Fourier-transformed pattern of the printed product 4 according to the first embodiment.
Figure 7:
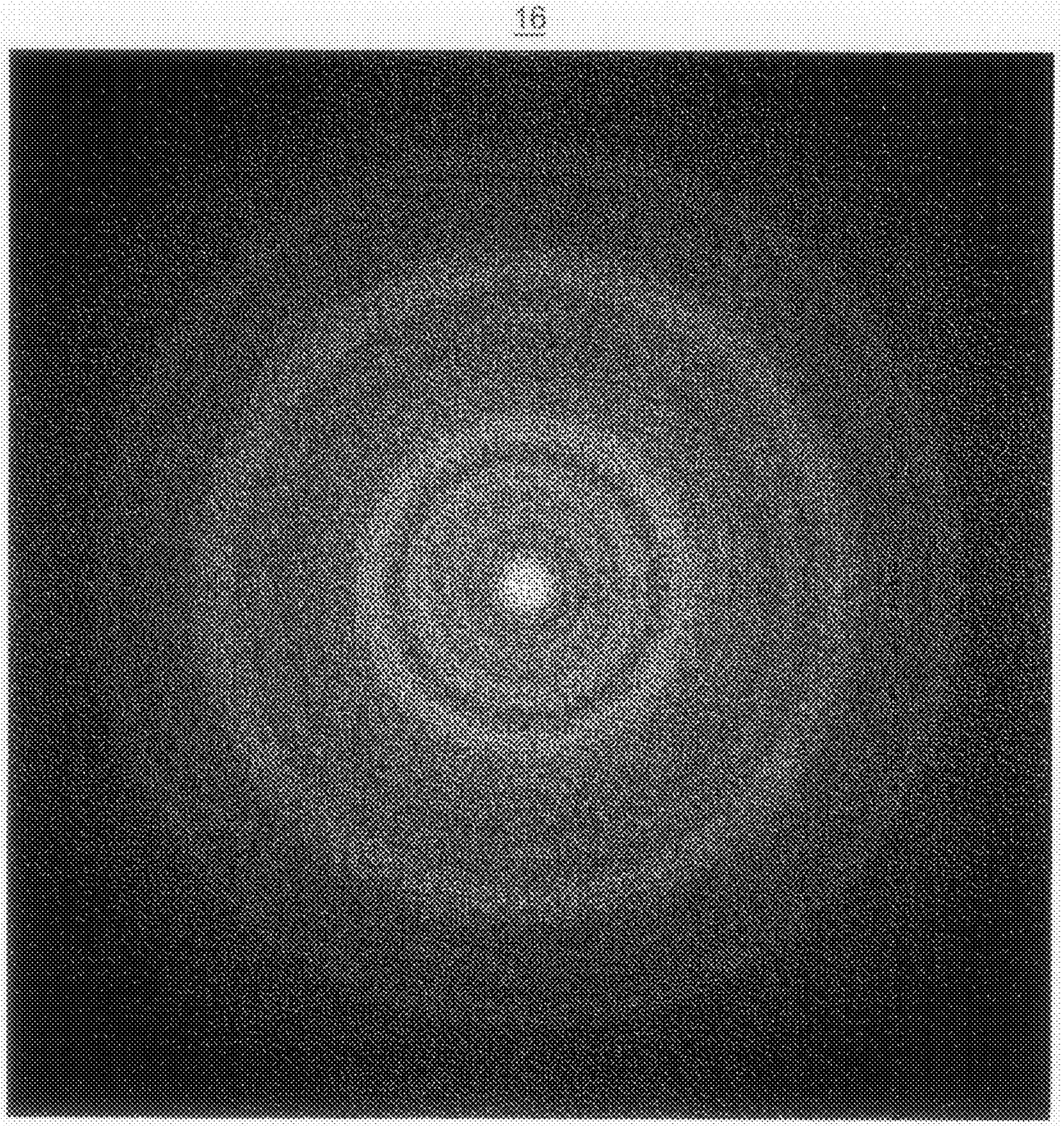
FIG. 7 is a view showing the Fourier-transformed pattern of the printed product 11 according to the first embodiment.

FIG. 6 shows a Fourier-transformed image 15 of the printed product 4 according to the first embodiment. FIG. 7 shows a Fourier-transformed image 16 of the printed product 11. The manner the embedded information "*264#" or "*831#" appears in the Fourier-transformed pattern will be described by exemplifying the Fourier-transformed images 15 and 16.

In the Fourier-transformed images 15 and 16 of the printed products 4 and 11, peak positions in the Fourier-transformed pattern are observed at the same frequency positions, i.e., the distances from the center to the circumferences of concentric circles. That is, the printed products 4 and 11 have the same unit width of 2,320 μm. Peaks are observed at the position of a frequency corresponding to the unit width and at positions corresponding to integral multiples of the frequency. At this point of time, the embedded information cannot be identified.

However, the peak intensities change between the Fourier-transformed pattern of the printed product 4 and that of the printed product 11. Especially, the difference is conspicuous in the 4th-order peak (fourth circle from the center). To embed different pieces of information ("*264#" and "*831#"), the unit 5 of the printed product 1 and the unit 12 of the printed product 4 use different information curved image line arrangement intervals. The intensity of the 4th-order peak changes due to this reason.

More specifically, if the two Fourier-transformed patterns have the same unit width, the peaks are observed at the same frequency positions. However, if the arrangement intervals of the information curved image lines in the unit are different, the peak intensity changes. It is therefore possible to recognize, on the basis of the Fourier-transformed pattern, the arrangement intervals of the information curved image lines in the unit related to the information embedded in the printed product. Embedding and reading of predetermined information in printed image lines can be implemented by making the arrangement intervals of information curved image lines correspond to the embedded information.

Several specific methods are usable to detect the embedded information of a printed product according to the first embodiment on the basis of a Fourier-transformed pattern and identify the embedded information corresponding to predetermined information. Three methods will be described here.

(1) A read image processing apparatus such as a computer stores Fourier-transformed patterns each corresponding to predetermined embedded information. The Fourier-transformed pattern of bitmap data read and detected from a printed product is compared with the Fourier-transformed patterns stored in advance, thereby identifying the embedded information corresponding to predetermined information (pattern matching).

(2) The kth-order peak density distribution curve (i.e., density distribution curve corresponding to, of the peaks on the Fourier-transformed pattern, the kth peak from the center) of Fourier-transformed data corresponding to predetermined embedded information is prepared in advance. This density distribution curve is compared with the kth-order peak density distribution of the Fourier-transformed data of bitmap data read and detected from a printed product, thereby identifying the embedded information corresponding to predetermined information.

(3) An intensity I(k) at the kth-order position of the Fourier-transformed pattern of bitmap data read from a printed product is calculated by $$I(k) = N\left[\left\{\sum_{j=1}^{n} f_j(k)T(k)\cos 2\pi k r_j\right\}^2 + \left\{\sum_{j=1}^{n} f_j(k)T(k)\sin 2\pi k r_j\right\}^2\right] \quad (1)$$

where N is the number of units 5 in the whole image lines, n is the number of curved image lines in the unit 5, xij is a numerical value obtained by normalizing the interval between the ith curved image line and the jth curved image line in the unit 5 by the unit width. The value xij is given by $$x_{ij} = (d_j - d_i) \Big/ \sum_{s=1}^{n} d_s \quad (2)$$

On the basis of equations (1) and (2), the value of the intensity I(k) at the kth-order peak position of the Fourier-transformed pattern is detected, and the simultaneous equations are solved. This allows to easy obtain the arrangement of curved image lines in the unit and detect the embedded information.

Identification of the printed product 1 having the unit 5 with the embedded information "*264#" will be described as an example. Assume that a digital image of the printed product 1 is read and Fourier-transformed to obtain a Fourier-transformed pattern. The image input device immediately grasps on the basis of the 1st-order peak position of FFT that the unit width is 2,320 μm.

The relative intensities at the 1st, 2nd, 3rd, 4th, and 5th peak positions of the Fourier-transformed pattern are read and substituted into equations (1) and (2). The simultaneous equations are solved by the least squares method, thereby obtaining the arrangement of the information curved image lines, i.e., the intervals of the curved image lines in the unit 5.

The intervals of congestions of the leading curved image line 9, information curved image lines $\mathbf{8}_1$ to $\mathbf{8}_4$, and terminal curved image line 10 are obtained from the simultaneous equations as 600 μm, 280 μm, 440 μm, 360 μm, and 160 μm. The embedded information is detected and then correlated with the decimal numbers based on Table 1. The embedded information is correlated with the predetermined information "*264#" so that the embedded information is identified. Even for the printed product 2 with the embedded information "*831#", detection and identification can be done in the same way.

As described above, even when symbols such as same numbers are repeated in a unit, clear peak intensities are obtained in the Fourier-transformed pattern. Hence, when a variety of curved image lines are periodically arranged, information can be embedded and read. In the first embodiment, information containing a three-digit decimal number is embedded. However, the present invention is not limited to this. According to the present invention, it is possible to express symbols such as numbers by using curved image lines independently of the number of digits and recognize the result from a Fourier-transformed pattern having the frequency and intensity of characteristic peak positions corresponding to the information such as numbers.

In the first embodiment, Fourier transform is used to analyze embedded information. However, any method other than the Fourier transform is usable if it can physically analyze the structure of unit image lines as spatial frequencies.

Second Embodiment

The second embodiment will be described next, in which the information recording amount is increased by using a plurality of kinds of unit image lines.

Figure 8:
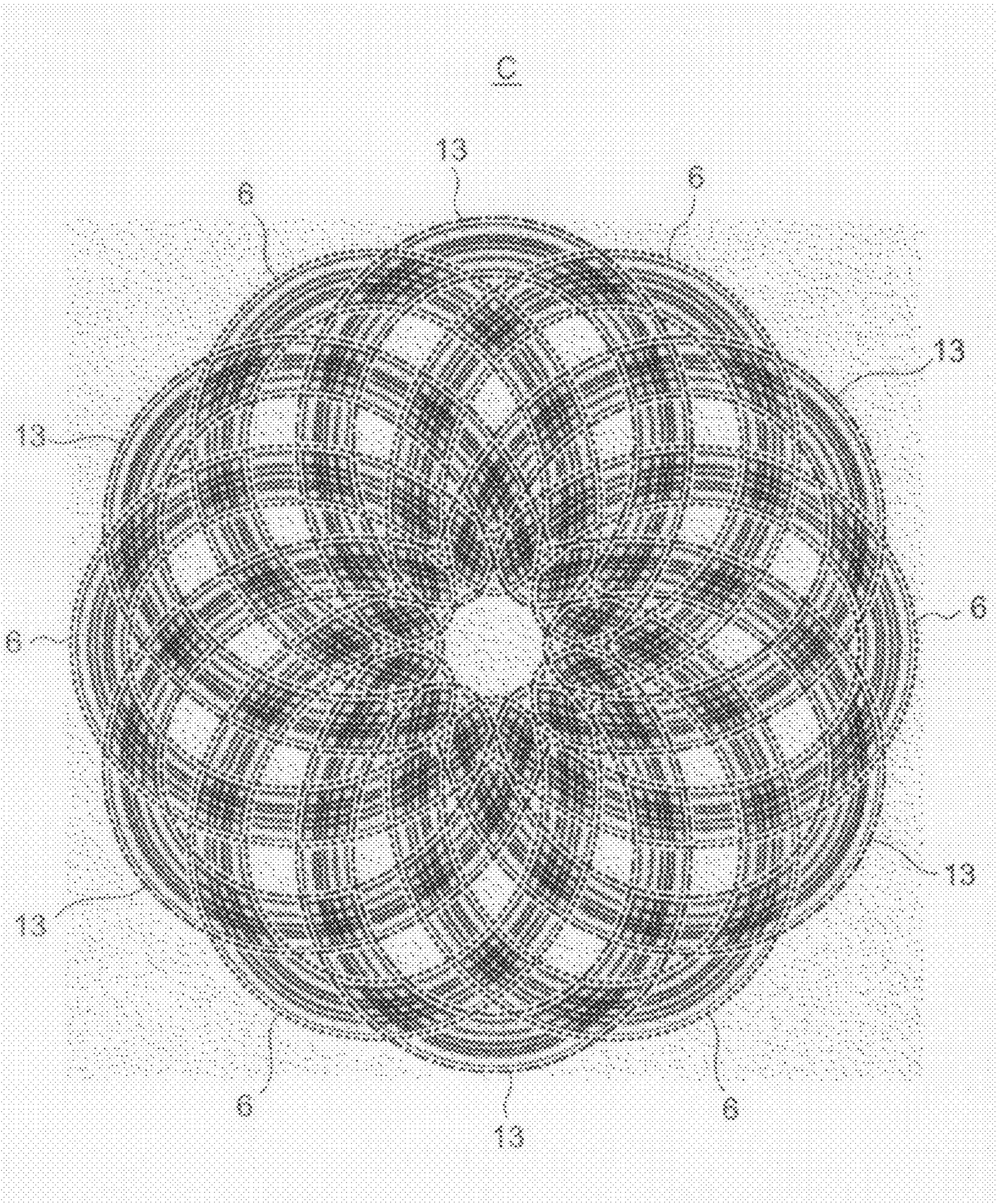
FIG. 8 is a view for explaining a printed product C having a colored security line drawing according to the second embodiment of the present invention.

FIG. 8 shows a printed product C having a colored security line drawing. A plurality of pieces of information are embedded in the printed product C. To do this, a security line drawing 1 shown in FIG. 1 is formed by using unit image lines having two kinds of structures, i.e., unit image lines 6 and unit image lines 13. The unit image lines 6 and unit image lines 13 are expressed by different colors, although the difference cannot be illustrated. For example, setting is done to print the unit image lines 6 in cyan and the unit image lines 13 in magenta. That is, in this embodiment, the security line drawing has different pieces of information corresponding to different colors. The printed product C in FIG. 8 is read by an optical image input device. The reading result is stored as a digital image. Color separation of the reading result is important here.

Figure 9:
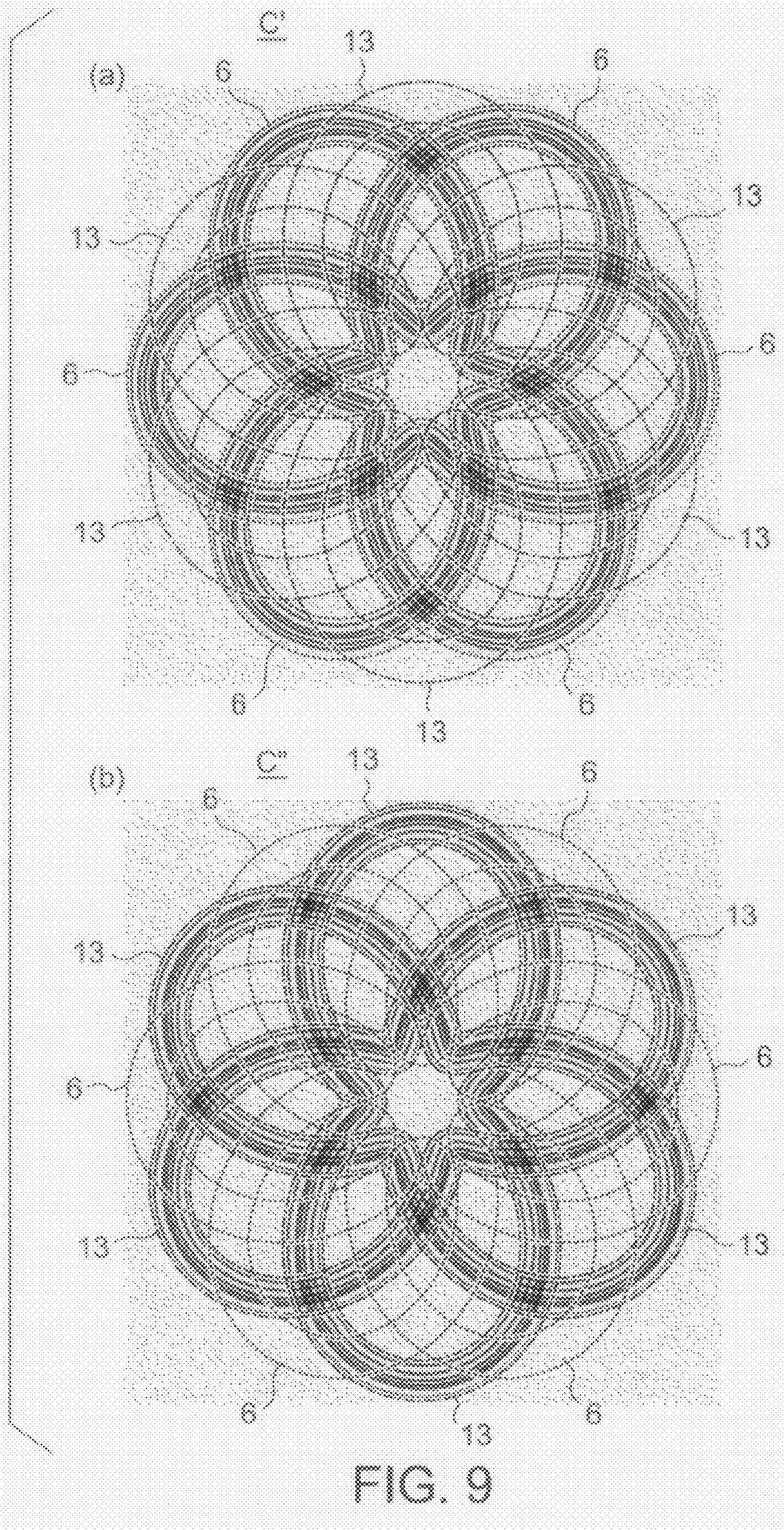
FIG. 9 illustrates separated images obtained by separating the colors of the printed product C according to the second embodiment through a color pass filter or separating the colors by filtering of a digital process.

For example, to optically separate colors through a color pass filter, a red or green pass filter is provided in the image input unit such as the lens of the optical image input device so that the image of the printed product C is input through it. When the image passes through a red pass filter, a separated image C' of the unit image lines 6 is obtained, as shown in FIG. 9A. When the image passes through a green pass filter, a separated image C" of the unit image lines 13 is obtained, as shown in FIG. 9B. Alternatively, for example, the image of the printed product C is input by using an optical image input device such as a scanner to obtain a digital color image. Filtering by a known digital process is executed to obtain the separated image C' of the unit image lines 6, as shown in FIG. 9A. When the image passes through a green pass filter, the separated image C" of the unit image lines 13 is obtained, as shown in FIG. 9B.

In the second embodiment, when the unit image lines 6 correspond to information "*246#", and the unit image lines 13 correspond to information "*831#", the printed product C shown in FIG. 8 can store a number having a total of six digits.

Third Embodiment

An embodiment will be described next, in which higher artistry and practicality are obtained by using unit image lines.

Figure 10:
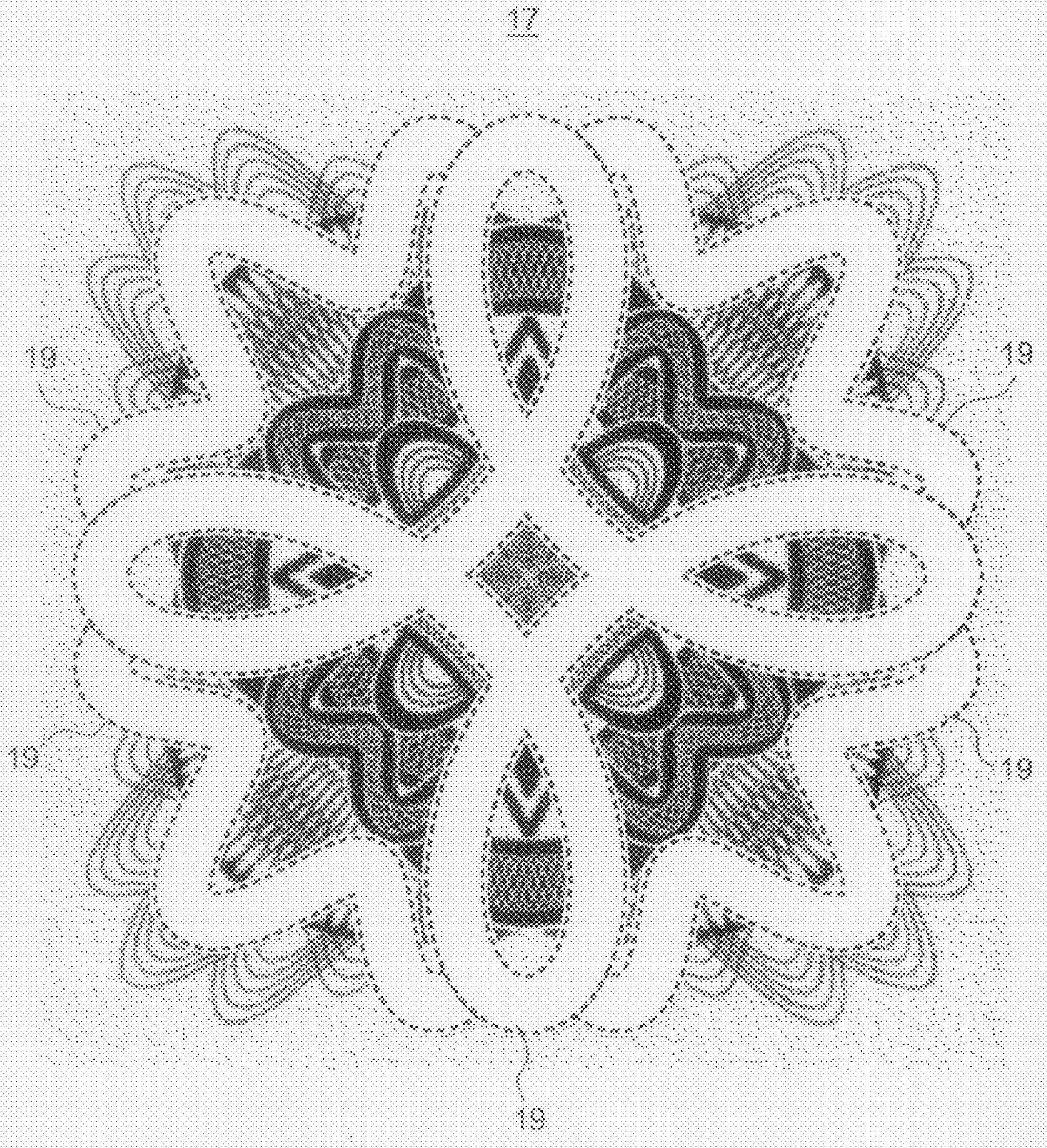
FIG. 10 is a view showing an example of a guilloche design element 17 including a line drawing according to the third embodiment.

FIG. 10 shows a guilloche design element 17 including a line drawing. A security line drawing used in securities and bank notes generally forms a complex graphic pattern by using various curve shapes and various image line widths, like the guilloche design element 17. In the design of the pattern of the guilloche design element 17, unit image line storage areas 19 are necessary for embedding information. Patterns in the remaining areas except the unit image line storage areas 19 correspond to dummy patterns to raise the artistry.

Figure 11:
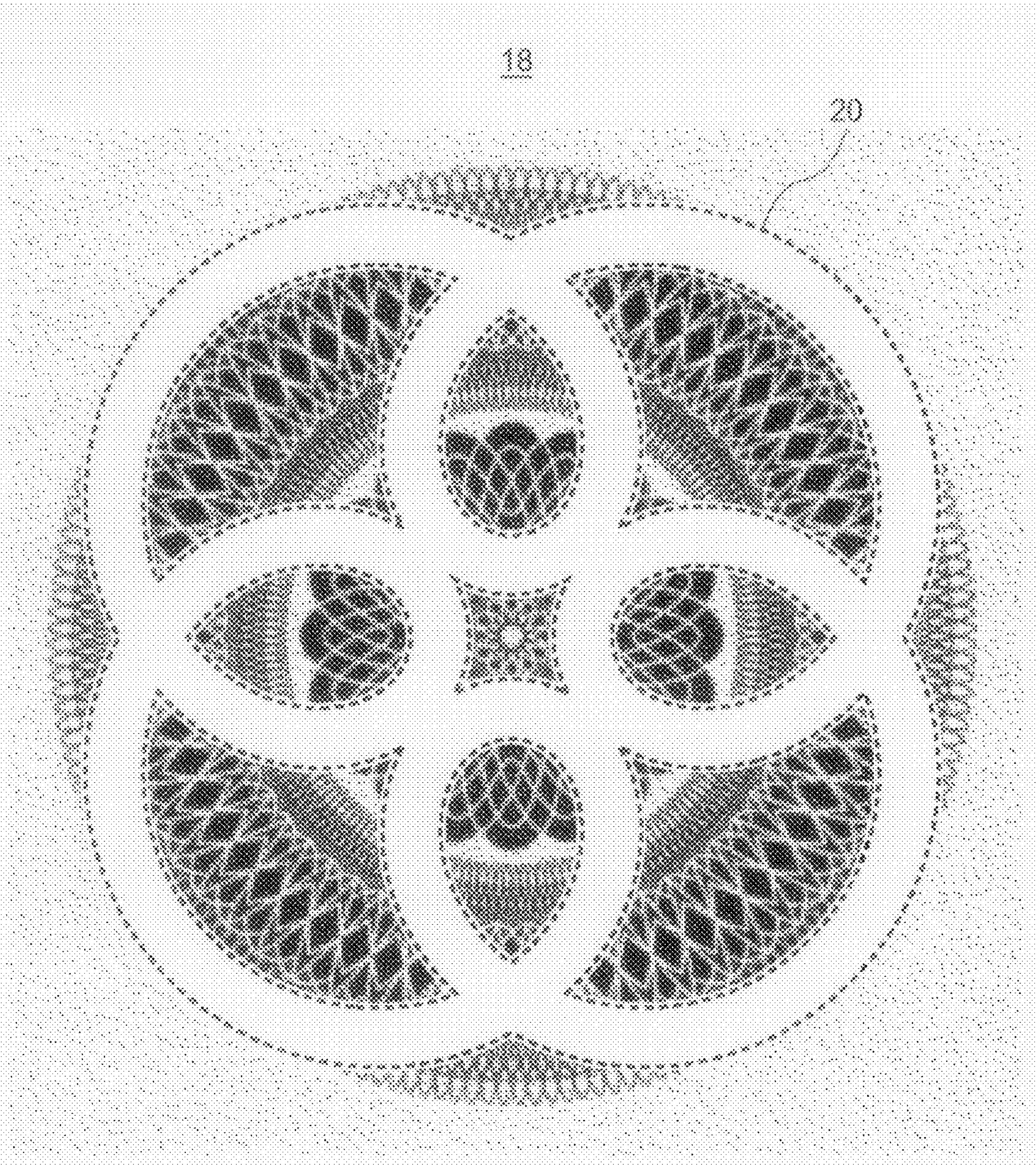
FIG. 11 is a view showing an example of a guilloche design element 18 including a line drawing according to the third embodiment.

A guilloche design element 18 shown in FIG. 11 has a unit image line storage area 20, like the guilloche design element 17 in FIG. 10, although the design is different from that of the guilloche design element 17. The unit image line storage area 20 is also necessary for embedding information. Patterns in the remaining areas except the unit image line storage area 20 are dummy patterns to raise the artistry.

Figure 12:
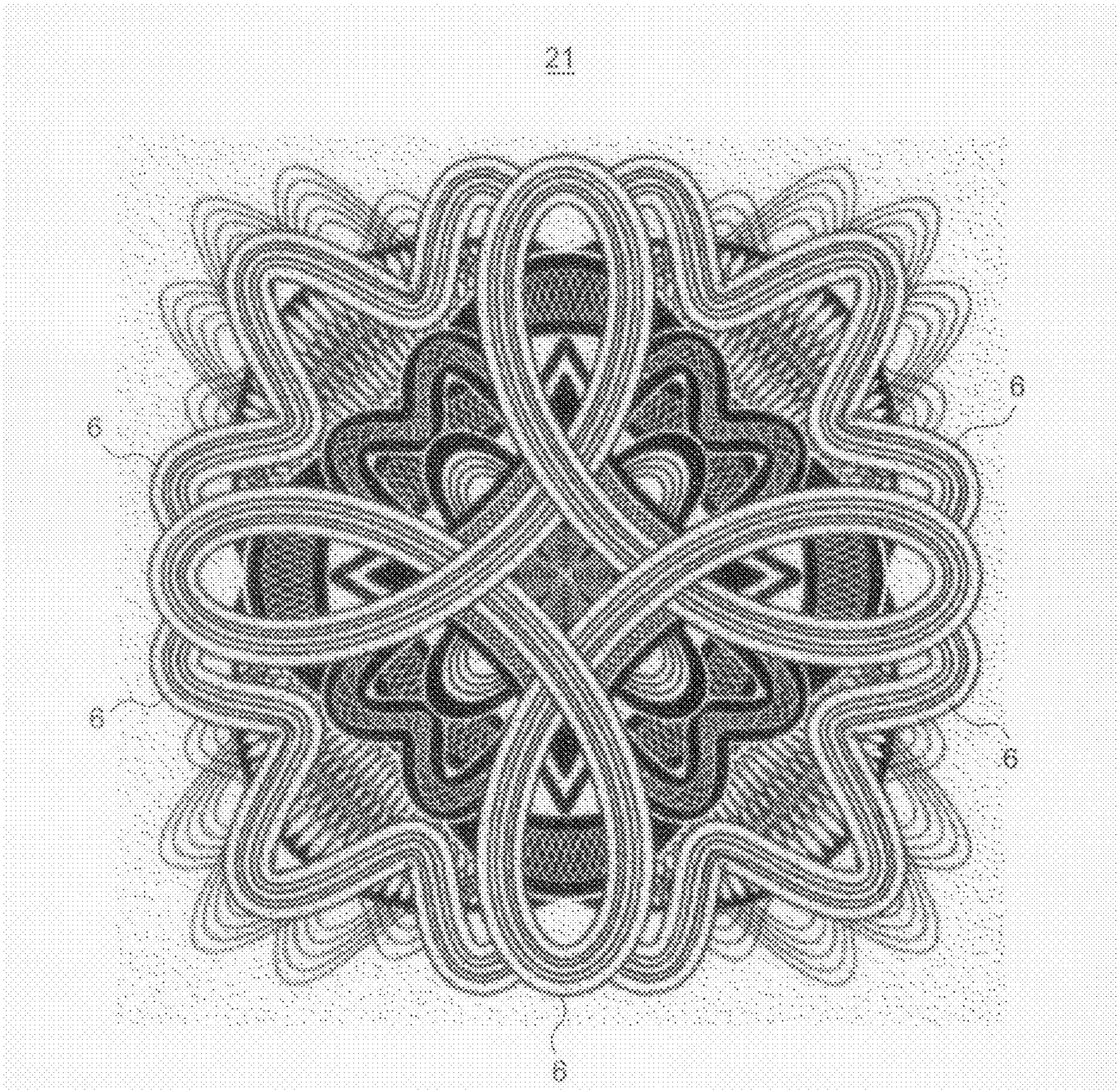
FIG. 12 is a view for explaining a guilloche design element 21 according to the third embodiment in which information "*264#" is embedded.

To embed information in the guilloche design element 17 in FIG. 10, the above-described unit image lines 6 are formed in the unit image line storage areas 19, and a guilloche design element 21 shown in FIG. 12 is obtained. The guilloche design element 21 can have embedded information "*264#".

Figure 13:
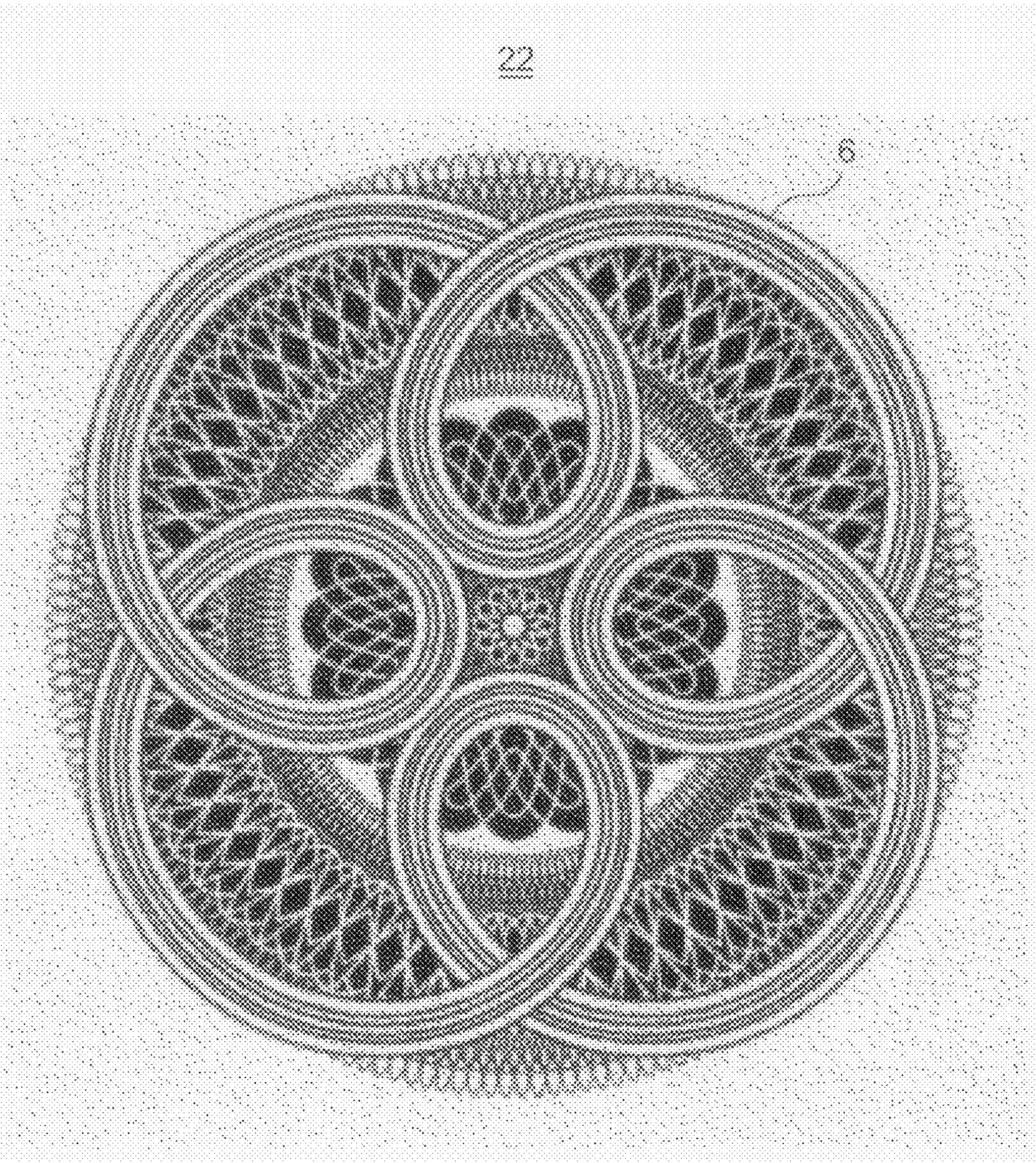
FIG. 13 is a view for explaining a guilloche design element 22 according to the third embodiment in which information "*264#" is embedded.

To embed information in the guilloche design element 18 in FIG. 11, the unit image lines 6 are formed in the unit image line storage area 20, and a guilloche design element 22 shown in FIG. 13 is obtained. The guilloche design element 22 can have embedded information "*264#". That is, it is possible to embed the same information in the guilloche design elements 21 and 22 even when they have different designs.

Figure 14:
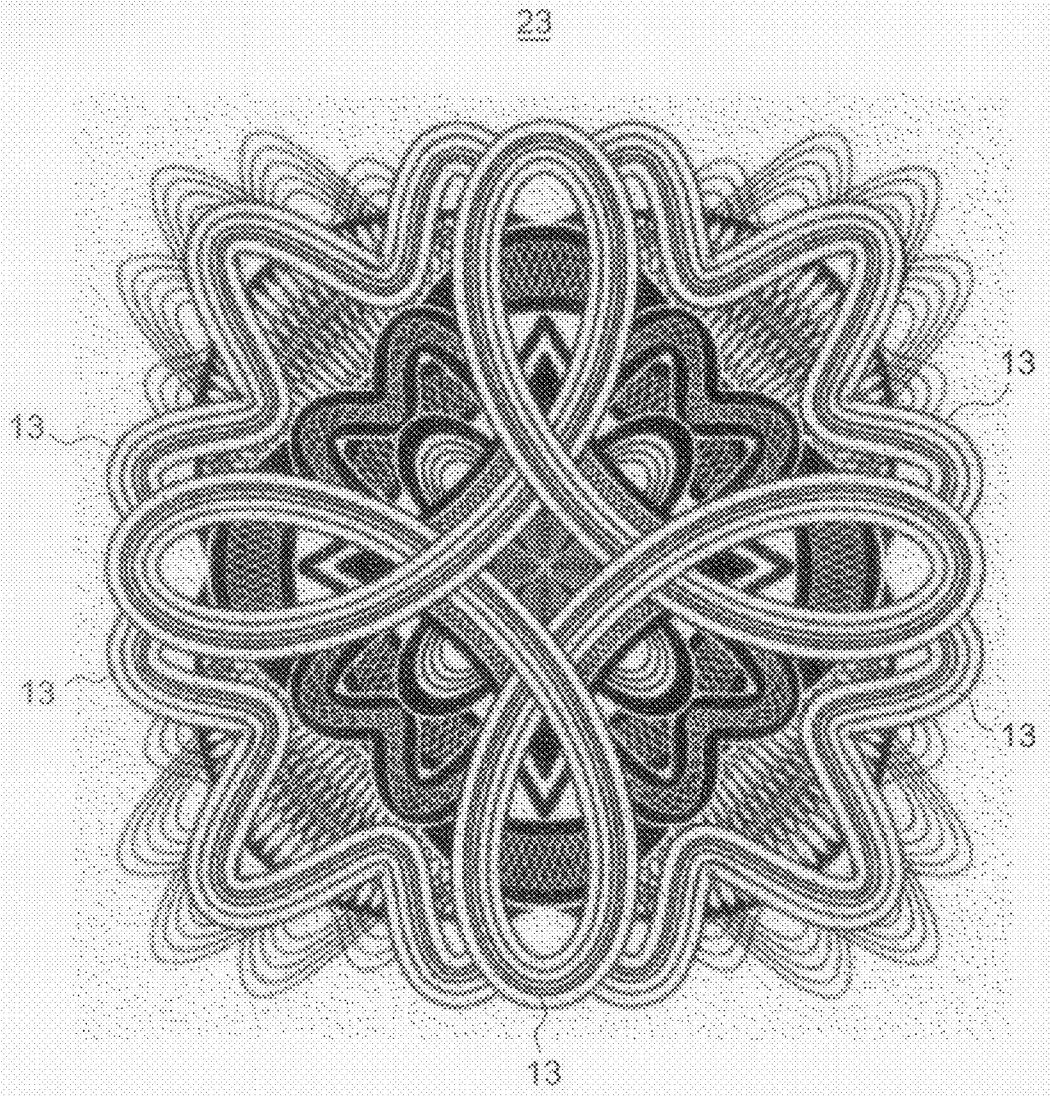
FIG. 14 is a view for explaining a guilloche design element 23 according to the third embodiment in which information "*264#" is embedded.

To embed information in the guilloche design element 17 in FIG. 10, the above-described unit image lines 13 are formed in the unit image line storage areas 19, and a guilloche design element 23 shown in FIG. 14 is obtained. The guilloche design element 23 can have embedded information "*831#".

Figure 15:
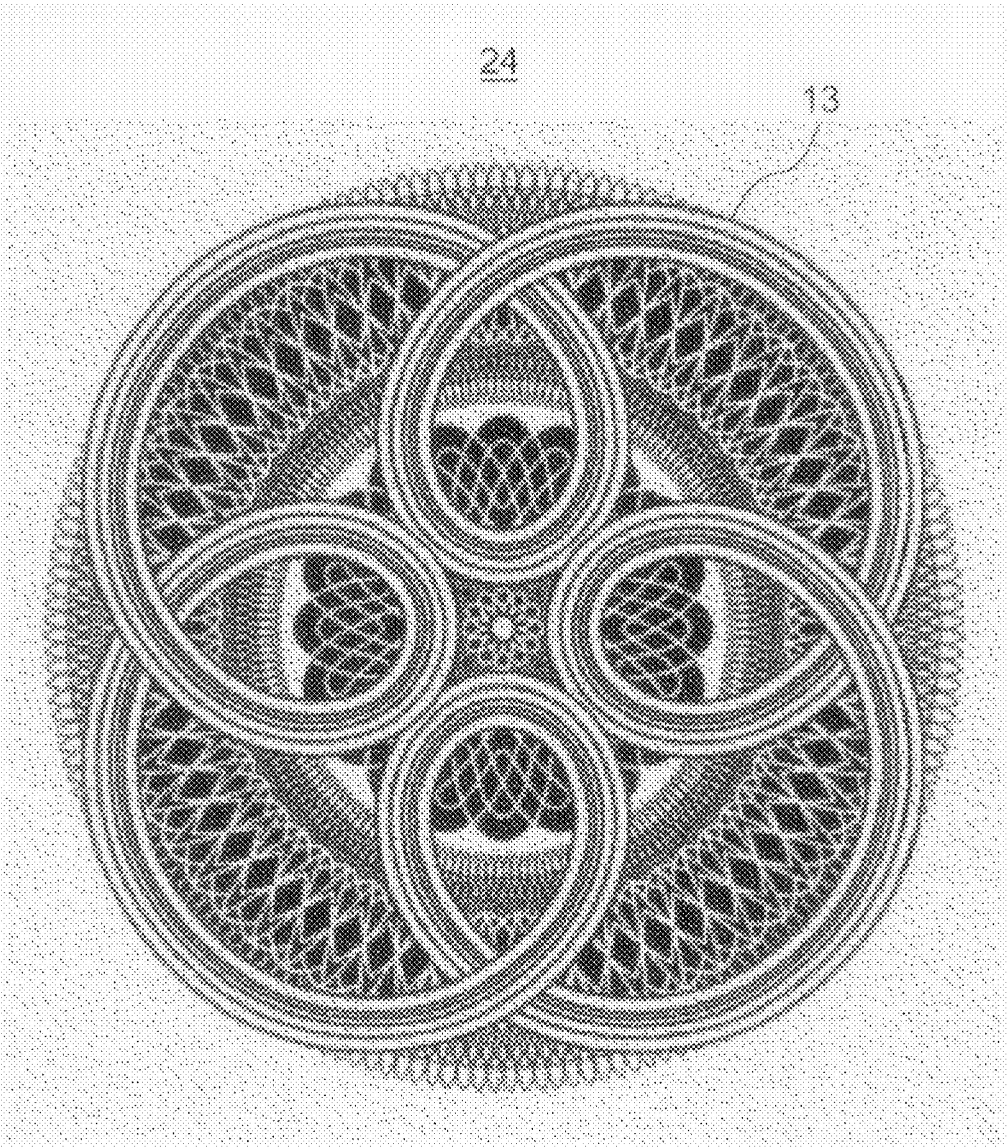
FIG. 15 is a view for explaining a guilloche design element 24 according to the third embodiment in which information "*264#" is embedded.

To embed information in the guilloche design element 18 in FIG. 11, the unit image lines 13 are formed in the unit image line storage area 20, and a guilloche design element 24 shown in FIG. 15 is obtained. The guilloche design element 24 can have embedded information "*831#". That is, it is possible to embed the same information in the guilloche design elements 22 and 24 even when they have different designs.

In this embodiment, the trick of dummy patterns also makes it difficult for naked eyes to recognize the difference between the unit image lines 6 and the unit image lines 13 in the entire images of the guilloche design elements. Hence, the guilloche design element 21 in FIG. 12 and the guilloche design element 23 in FIG. 14 have different pieces of embedded information although they have the same design. Additionally, the guilloche design element 22 in FIG. 13 and the guilloche design element 24 in FIG. 15 have different pieces of embedded information although they have the same design. The dummy patterns preferably cause no mutual interference between the peak intensities of the Fourier-transformed pattern in association with the unit image lines 6 or 13. It is therefore preferable to use a dummy pattern which continuously changes, e.g., the image line interval and image line width rather than a pattern including strongly periodic elements.

Fourth Embodiment

A printed product authentication method and authentication apparatus according to the fourth embodiment of the present invention, which apply a guilloche design element containing embedded information to various kinds of security measures such as personal authentication, will be described next.

Figure 16:
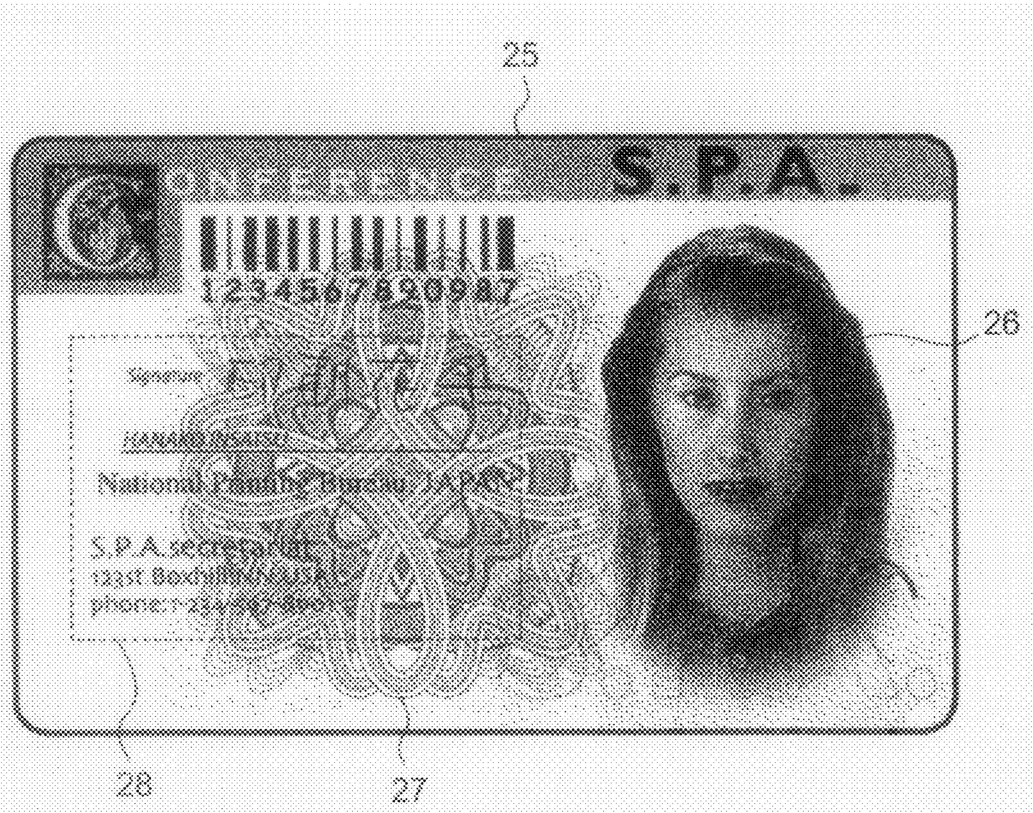
FIG. 16 is a view showing an overall image of a personal certificate printed product 25 according to the fourth embodiment of the present invention.

FIG. 16 shows an overall image of a personal certificate printed product 25. For example, the personal certificate printed product 25 includes a portrait portion 26 having a photo or portrait of a person who carries the printed product 25, a guilloche design element portion 27 where the information of the person who carries the printed product 25 is embedded, and a personal information text portion 28 where the information of the person who carries the printed product 25 is printed on the guilloche design element portion 27. The information embedded in the guilloche design element portion 27 is information about the person who carries the printed product 25, including a password, birth information, information of place (country) of residence, and biological information. The contents are not particularly limited.

Figure 17:
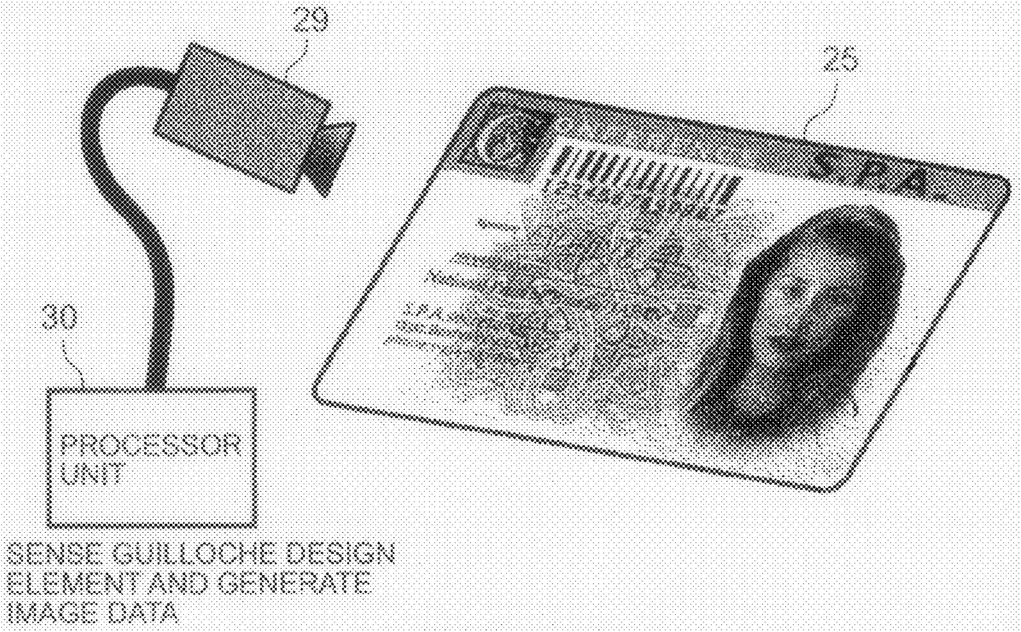
FIG. 17 is a view showing an optical image input device 29 which reads information embedded in a guilloche design element portion 27 of the personal certificate printed product 25 according to the fourth embodiment.

To read the information embedded in the guilloche design element portion 27 of the personal certificate printed product 25, an optical image input device 29 such as a CCD camera senses (or scans) the guilloche design element portion 27, as shown in FIG. 17. The input image data is transmitted to a processor unit 30. The optical image input device 29 such as a CCD camera is not limited to a particular form, and any device such as a digital still camera or camera-equipped portable phone incorporating the processor unit 30 is usable.

A method and apparatus for forming the guilloche design element portion 27 on the personal certificate printed product 25 according to this embodiment will be described next.

Figure 18:
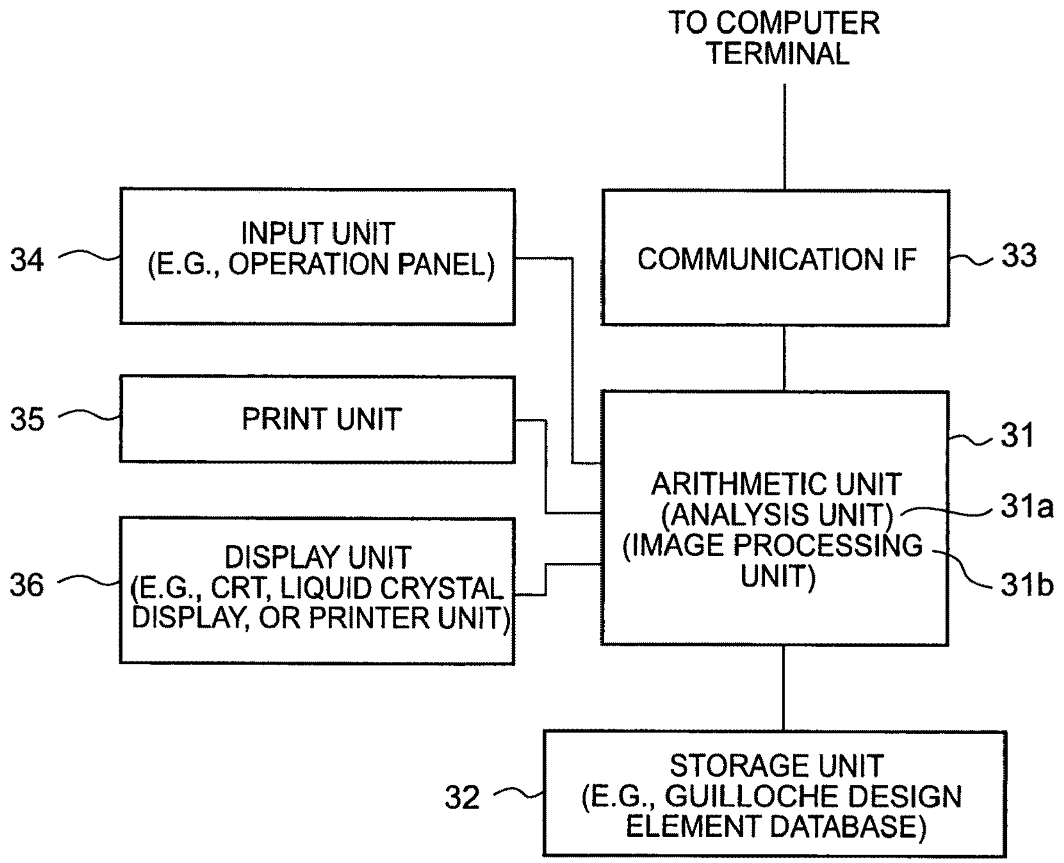
FIG. 18 is a block diagram showing a method of forming the guilloche design element portion 27 on the personal certificate printed product 25 according to the fourth embodiment and the arrangement of an apparatus therefor.

This apparatus includes an arithmetic unit 31, storage unit 32, communication interface (IF) 33, input unit 34, print unit 35, and display unit 36, as shown in FIG. 18.

The arithmetic unit 31 executes all operations necessary for processing and has an analysis unit 31*a* and an image processing unit 31*b*. The arithmetic unit 31 is connected to the storage unit 32, communication IF 33, input unit 34, print unit 35, and display unit 36.

The analysis unit 31*a* encodes personal information and generates a unit on the basis of a unit conversion table from the encoded personal information.

The image processing unit 31*b* forms unit image lines in the unit image line storage area of the guilloche design element portion 27.

The storage unit 32 serves as a database which stores various kind of data necessary for the operations of the arithmetic unit 31 and registers the guilloche design element portion 27 in advance. Lathe work element data each having a unit image line storage area are registered in the database.

The communication IF 33 connects the arithmetic unit 31 to a computer terminal (not shown) and transfers the personal information of the portrait portion 26 formed from a photo or portrait obtained from an external computer terminal or the text of the personal information text portion 28.

The input unit 34 including, e.g., an operation panel receives an input from the operator and gives the operation contents to the arithmetic unit 31.

The print unit 35 prints a document file that combines the guilloche design element portion 27 with another personal information element and outputs a printed product.

The display unit 36 has at least one of, e.g., a CRT, liquid crystal display, and printer and displays information necessary for the operator.

Figure 19:
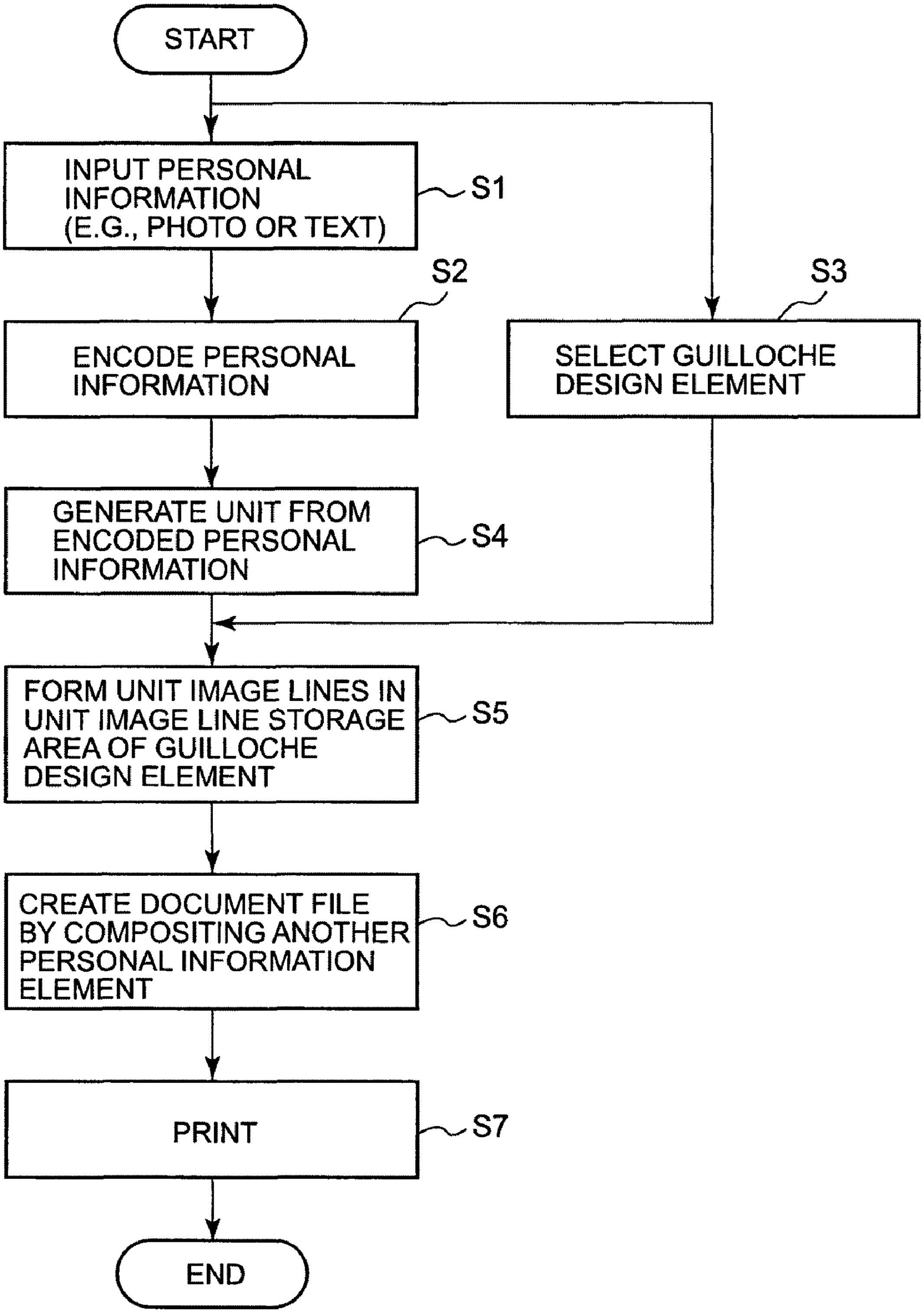
FIG. 19 is a flowchart illustrating a procedure of forming the guilloche design element portion 27 according to the fourth embodiment.

The procedure of the method of forming the guilloche design element portion 27 by using the apparatus with the above-described arrangement will be described with reference to the flowchart in FIG. 19.

In step S1, the operator transfers, to the arithmetic unit 31, the personal information of the portrait portion 26 formed from a photo or portrait obtained from an external computer terminal or the text of the personal information text portion 28 by operating the input unit 34. The operator also inputs, from the operation panel, personal information such as a password, birth information, information of place (country) of residence, and biological information.

In step S2, the analysis unit 31*a* encodes at least one of the pieces of input personal information such as the password, birth information, information of place (country) of residence, and biological information by a predetermined process into information containing, e.g., a combination of decimal numbers described in the first embodiment. The process advances to step S4.

In step S4, the analysis unit 31*a* generates a unit from the encoded personal information on the basis of the unit conversion table described in the first embodiment. The process advances to step S5.

In step S3, the operator selects, from the database, a guilloche design element registered in advance to be used in the guilloche design element portion 27 via the input unit 34 in step S1. The process advances to step S5.

In step S5, the image processing unit 31*b* generates unit image lines in the unit image line storage area of the guilloche design element portion 27 selected in step S3 on the basis of the unit generated from the personal information in step S4. The process advances to step S6.

In step S6, the image processing unit 31*b* composites the guilloche design element portion 27 having the unit image lines generated in the unit image line storage area in step S5 with the remaining pieces of personal information, i.e., the personal information of the portrait portion 26 formed from a photo or portrait and/or the text of the personal information text portion 28. With this composition, a document file with a completed form of the personal certificate printed product 25 shown in FIG. 16 is created. The process advances to step S7.

In step S7, the print unit 35 prints the document file created in step S6. After this, the display unit 36 displays the surface of the printed product after arrangement as needed, although this step is not illustrated.

According to the fourth embodiment, it is possible to easily form a printed product having latent desired personal information in the guilloche design element portion 27.

A method of determining the authenticity of the personal certificate printed product 25 according to this embodiment and an apparatus used for authenticity determination will be described next.

Figure 20:
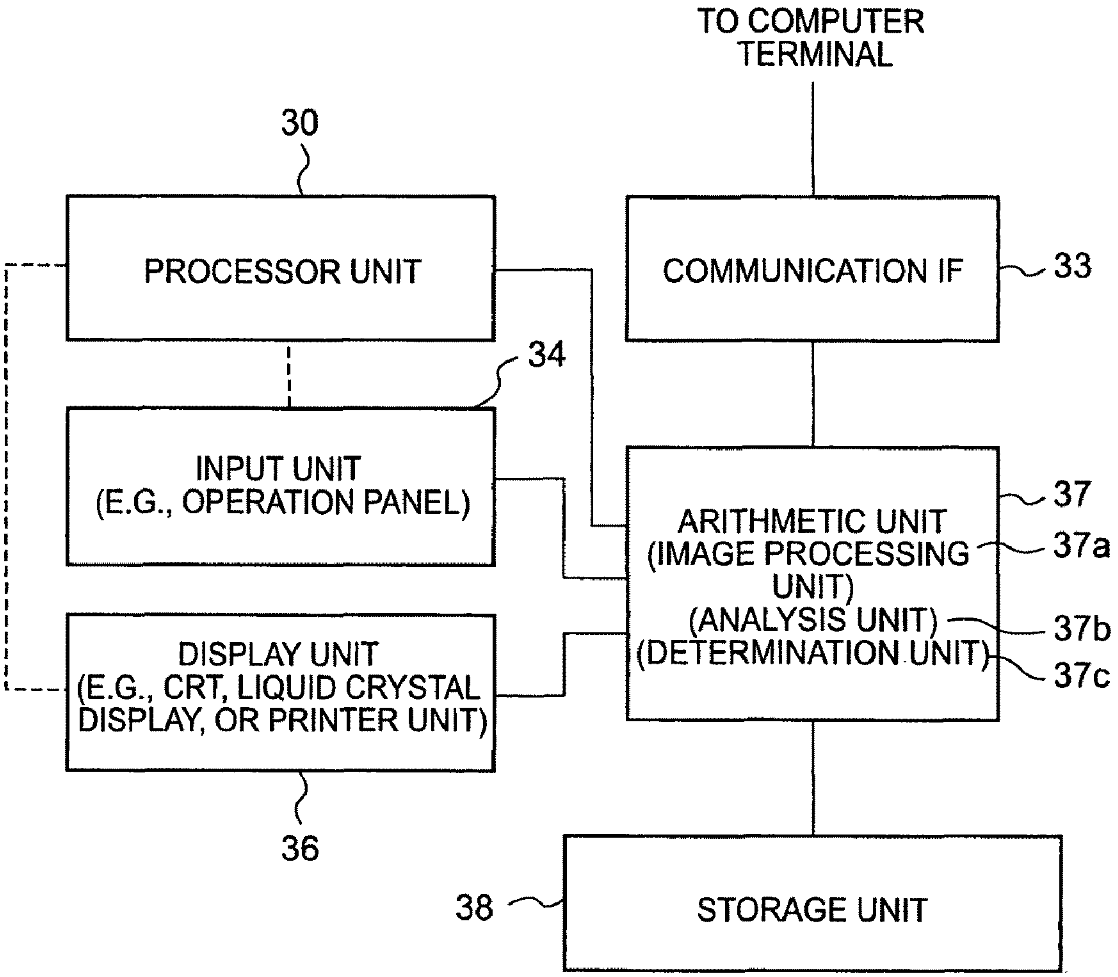
FIG. 20 is a block diagram showing the arrangement of an apparatus which determines the authenticity of the personal certificate printed product 25 according to the fourth embodiment.

FIG. 20 shows the arrangement of an authenticity determination apparatus. The same reference numerals as in the apparatus shown in FIG. 18 denote the same elements in FIG. 20. This apparatus includes an arithmetic unit 37, storage unit 38, communication IF 33 input unit 34, and display unit 36.

The arithmetic unit 37 is connected to the processor unit 30 via the communication IF 33 and a computer terminal (not shown) and also executes transmission/reception to/from another computer terminal, as needed. The arithmetic unit 37 has an analysis unit 37*b*, image processing unit 37*a*, and determination unit 37*c* and is connected to the communication IF 33, storage unit 38, input unit 34, and display unit 36.

The storage unit 38 serves as a database which stores data necessary for the reading process and process results and also registers personal information.

The processor unit 30 causes the optical image input device 29 such as a CCD camera to sense (or scan) the personal certificate printed product 25 and supplies the input image data to the communication IF 33, as shown in FIG. 17.

The communication IF 33 supplies the image data obtained from the processor unit 30 to the arithmetic unit 37. The communication means between the communication IF 33 and the arithmetic unit 37 is not limited to a wired or wireless means. A wide area network such as the Internet may be used.

The input unit 34 including, e.g., an operation panel receives an input from the operator and gives the operation contents to the arithmetic unit 37. The input unit 34 can also give, to the arithmetic unit 37, the operation contents of an input received from the operator via the processor unit 30 and communication IF 33.

The image processing unit 37*a* cuts out the guilloche design element portion 27 from the image data of the personal certificate printed product 25 obtained via the communication IF 33. As described in the first embodiment, the image processing unit 37*a* also obtains, e.g., a Fourier-transformed image from the cut guilloche design element portion 27.

The analysis unit 37*b* analyzes the structure of unit image lines on the basis of the Fourier-transformed pattern of the Fourier-transformed image. The method using Fourier transform described in the first embodiment is merely an example. Any method other than Fourier transform is also usable if the structure of a unit image line can physically be analyzed as spatial frequencies.

The determination unit 37*c* determines on the basis of the analysis result of the analysis unit 37*b* whether the data matches the personal information registered in the database of the recording unit 38.

The display unit 36 has at least one of, e.g., a CRT, liquid crystal display, and printer and displays information necessary for the operator. The display unit 36 can also display information necessary for the operator, which is obtained from the arithmetic unit 37, via the communication IF 33 and processor unit 30.

Figure 21:
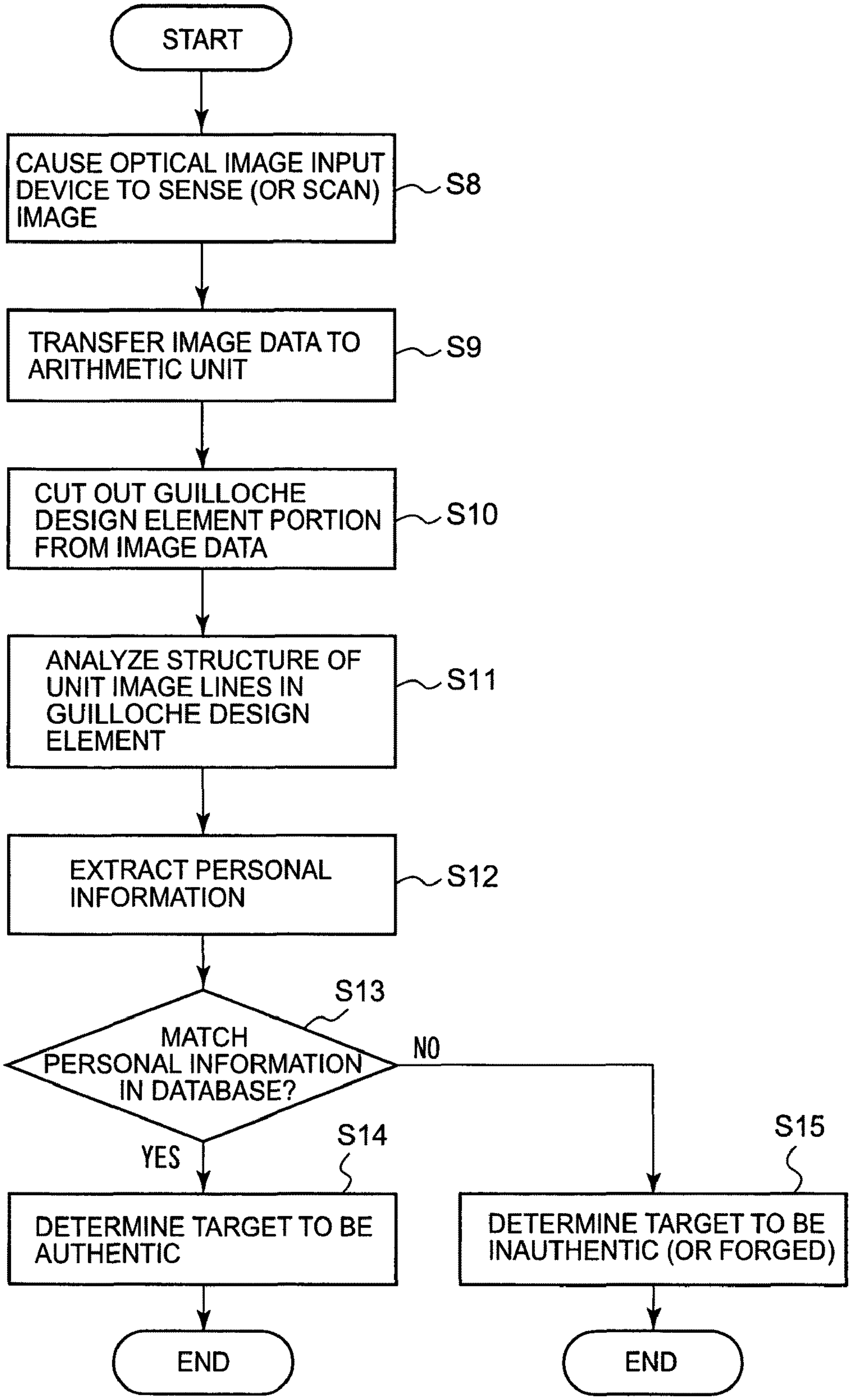
FIG. 21 is a flowchart illustrating a procedure of reading a unit image line of the guilloche design element portion 27 according to the fourth embodiment.

The procedure of the method of reading the unit image lines of the guilloche design element portion 27 by using the apparatus with the above-described arrangement will be described with reference to the flowchart in FIG. 21.

In step S8, the optical image input device 29 such as a CCD camera senses (or scans) the personal certificate printed product 25 to obtain image data, as shown in FIG. 17.

In step S9, the image data obtained from the optical image input device 29 is transferred to the arithmetic unit 37 via the communication IF 33.

In step S10, the image processing unit 37*a* extracts the guilloche design element portion 27 contained in the image data obtained from the personal certificate printed product 25. Note that the image data cutout is executed as needed in the fourth embodiment, and that the image processing algorithm is not particularly limited.

The image processing unit 37*a* Fourier-transforms the image data of the cut guilloche design element portion 27 to obtain a Fourier-transformed image. The process advances to step S11.

In step S11, the analysis unit 37*b* analyzes the structure of unit image lines in the guilloche design element portion 27 on the basis of the Fourier-transformed pattern of the Fourier-transformed image. The method using Fourier transform is merely an example. Any method other than Fourier transform is also usable if it can physically analyze the structure of a unit image line.

In step S12, the analysis unit 37*b* extracts personal information embedded in the unit image lines on the basis of the analysis result in step S11.

Ins step S13, the determination unit 37*c* determines whether the extracted personal information matches that registered in the database of the recording unit 38.

If the personal information matches that registered in the database of the recording unit 38, the process advances to step S14 to determine that the holder of the printed product is authentic. If the personal information does not match that registered in the database of the recording unit 38, the process advances to step S15 to determine that the holder of the printed product 25 is inauthentic, or the printed product is a forged printed product.

According to the fourth embodiment, whether the holder is authentic or not can easily be determined by reading personal information based on the analysis of the mathematical structure of the guilloche design element portion 27 formed on the printed product 25.

According to the information authenticable printed product of the embodiments, it is possible to embed information by forming a security line drawing by unit image lines each including a unit having a plurality of curved image lines. Additionally, it is possible to detect and authenticate the embedded information by reading the security line drawing as a digital image and analyzing the structure of the unit image lines by using, e.g., Fourier transform. This allows to enhance the anti-forgery effect without decreasing the artistic effect of printed image lines.

Especially according to the above-described embodiments, the image lines of the original drawing of a printed product are formed as unit image lines each including a unit having a plurality of curved image lines along the direction of the normal serving as the centerline. The normal-direction intervals between the plurality of curved image lines in the unit are set in correspondence with information to be embedded, thereby embedding the information. Since information embedded in a printed product can be detected by a frequency analysis method such as Fourier transform, and its authenticity can be determined. Hence, it is possible to easily and stably execute an authenticity determination process and enhance the anti-forgery effect. Simultaneously, this system which is inexpensive and easy to handle is useful in various fields such as securities, various kinds of certificates, and important documents.

The embodiments of the present invention have been described above. However, the present invention is not limited to the above-described embodiments, and various changes and modifications can be made within the scope of technical specifications described in the claims.

The invention claimed is:

1. A method of detecting information of a printed product which includes a line drawing, the line drawing having a unit image line including a plurality of image lines arrayed in parallel along a normal direction, and a distance between centers of lines in a normal direction formed by the plurality of lines in the unit image line and/or a width of a margin is set in correspondence with information to be embedded, the method using a processor and comprising the steps of:

causing the processor to acquire image data of the line drawing; and detecting the information by causing an image processing unit to execute spatial frequency analysis of the image data, generating a spatial frequency analysis pattern, and outputting an analysis result.

2. A method of detecting information of a printed product of claim 1, wherein at least a background area of the printed product having no unit image line in the line drawing has a dummy pattern, the unit image line includes the plurality of unit image lines having different image line colors, and the plurality of unit image lines correspond to different pieces of information, respectively, the method further comprising the steps of:

acquiring color image digital data by causing an optical image input device having a color pass filter to input an image of the printed product to an image input unit or by causing an optical image input device to input an image of the printed product to an image input unit; and acquiring image data corresponding to at least one color unit image line of the plurality of unit image lines by causing an image processing unit to separate the colors of the color image digital data by using filtering by a digital process.

3. An apparatus for detecting information of a printed product which includes a line drawing, the line drawing having a unit image line including a plurality of image lines arrayed in parallel along a normal direction, and a distance between centers of lines in a normal direction formed by the plurality of lines in the unit image line and/or a width of a margin is set in correspondence with information to be embedded, comprising:

a processor which acquires image data of the line drawing;

an image processing unit which extracts a spatial frequency pattern of the unit image line in the line drawing contained in the image data; and an analysis unit which analyzes information contained in the spatial frequency pattern and outputs an analysis result.

4. An apparatus for detecting information of a printed product of claim 3, wherein at least a background area of the printed product having no unit image line in the line drawing has a dummy pattern, the unit image line includes the plurality of unit image lines having different image line colors, and the plurality of unit image lines correspond to different pieces of information, respectively.

5. A method of authenticating information of a printed product which includes a line drawing, the line drawing having a unit image line including a plurality of image lines arrayed in parallel along a normal direction, and a distance between centers of lines in a normal direction formed by the plurality of lines in the unit image line and/or a width of a margin is set in correspondence with information to be embedded, the method using a processor and comprising the steps of:

causing the processor to acquire image data of the line drawing;

causing an image processing unit to execute spatial frequency analysis of the image data and generate a spatial frequency analysis pattern; and causing a determination unit to compare the spatial frequency analysis pattern with a predetermined reference pattern; and authenticating the information.

6. A method of authenticating information of a printed product of claim 5, wherein at least a background area of the printed product having no unit image line in the line drawing has a dummy pattern, the unit image line includes the plurality of unit image lines having different image line colors, and the plurality of unit image lines correspond to different pieces of information, respectively, the method further comprising the steps of:

acquiring color image digital data by causing an optical image input device having a color pass filter to input an image of the printed product to an image input unit or by causing an optical image input device to input an image of the printed product to an image input unit; and acquiring image data corresponding to at least one color unit image line of the plurality of unit image lines by causing an image processing unit to separate the colors of the color image digital data by using filtering by a digital process.

7. An apparatus for authenticating information of a printed product which includes a line drawing, the line drawing having a unit image line including a plurality of image lines arrayed in parallel along a normal direction, and a distance between centers of lines in a normal direction formed by the plurality of lines in the unit image line and/or a width of a margin is set in correspondence with information to be embedded, the apparatus further comprising:

a processor which acquires image data of the printed product;

an image processing unit which cuts out a line drawing portion contained in the image data and extracts a spatial frequency pattern of the unit image line contained in the line drawing;

an analysis unit which analyzes information contained in the spatial frequency pattern; and a determination unit which compares the information of the spatial frequency pattern with information of a spatial frequency pattern contained in a predetermined authentic printed product and determines whether the printed product is authentic.

8. An apparatus for authenticating information of a printed product of claim 7, wherein at least a background area of the printed product having no unit image line in the line drawing has a dummy pattern, the unit image line includes the plurality of unit image lines having different image line colors, and the plurality of unit image lines correspond to different pieces of information, respectively.

* * * * *